(12) United States Patent
Ozaki et al.

(10) Patent No.: US 6,333,823 B1
(45) Date of Patent: Dec. 25, 2001

(54) ZOOM LENS SYSTEM

(75) Inventors: Hiroyasu Ozaki, Tokyo; Takayuki Ito, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,919

(22) Filed: Dec. 20, 1999

(30) Foreign Application Priority Data

Dec. 22, 1998 (JP) ............................................. 10-365721
Dec. 22, 1998 (JP) ............................................. 10-365722

(51) Int. Cl.$^7$ ............................................... G02B 15/14
(52) U.S. Cl. ........................................ 359/690; 359/687
(58) Field of Search ................................. 359/690, 687, 359/676, 678, 683, 686, 689

(56) References Cited

U.S. PATENT DOCUMENTS

| | | | |
|---|---|---|---|
| 3,357,775 | * 12/1967 | Appeldorn et al. | 359/676 |
| 4,249,793 | * 2/1981 | Uehara | 359/676 |
| 5,442,484 | * 8/1995 | Shikawa | 359/651 |
| 6,072,637 | * 6/2000 | Okada et al. | 359/676 |

FOREIGN PATENT DOCUMENTS 10-20191    1/1998   (JP) .

\* cited by examiner

*Primary Examiner*—Jordan M. Schwartz
(74) *Attorney, Agent, or Firm*—Greenblum & Bernstein, P.L.C.

(57) ABSTRACT

A zoom lens system includes a plurality of lens groups, wherein a deflector which deflects the optical axis of said zoom lens system is positioned between lens groups which are made moveable upon zooming.

23 Claims, 29 Drawing Sheets

Fig. 2
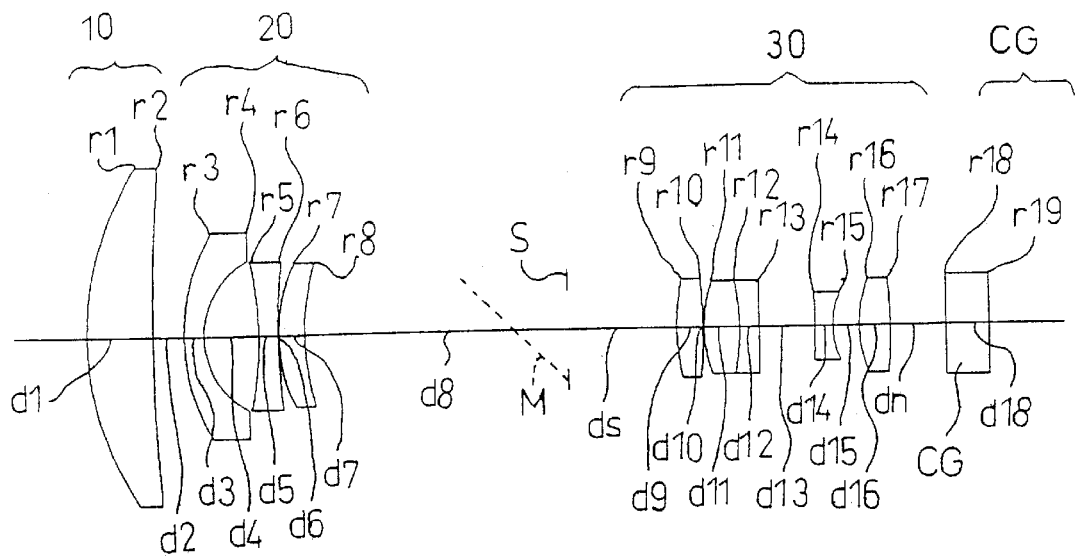
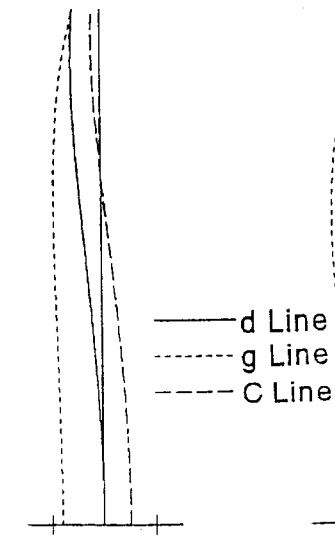
Fig. 3A
1:2.8
——— d Line
········ g Line
— — — C Line
-0.1    0.1
SPHERICAL
ABERRATION
CHROMATIC
ABERRATION
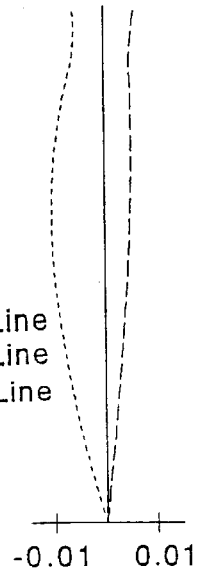
Fig. 3B
W=28.5
-0.01   0.01
LATERAL
CHROMATIC
ABERRATION
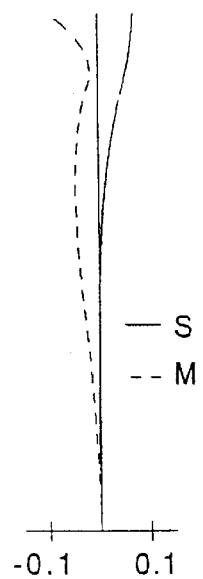
Fig. 3C
W=28.5
——— S
— — M
-0.1    0.1
ASTIGMATISM
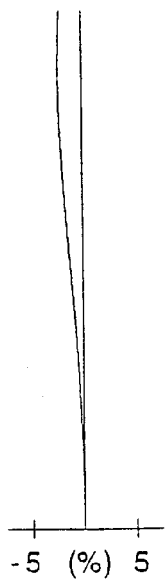
Fig. 3D
W=28.5
-5  (%)  5
DISTORTION

Fig. 4
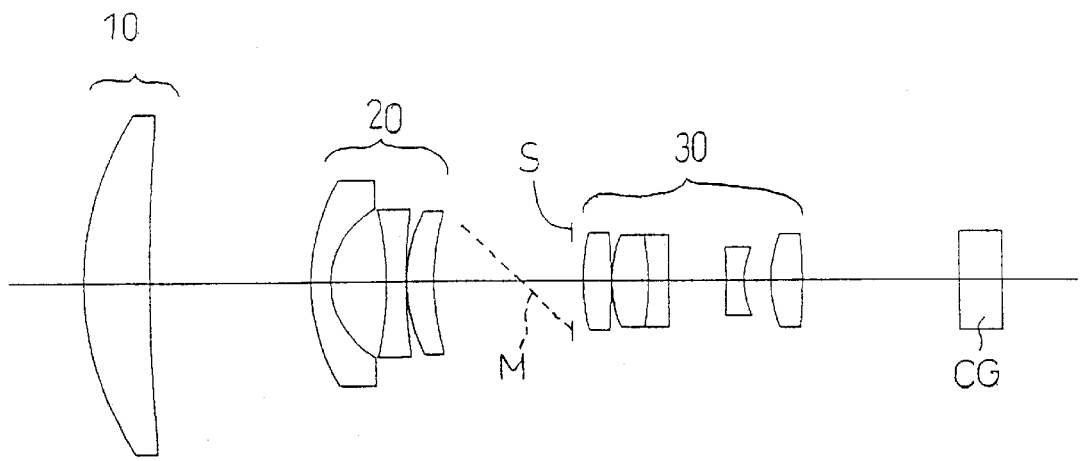
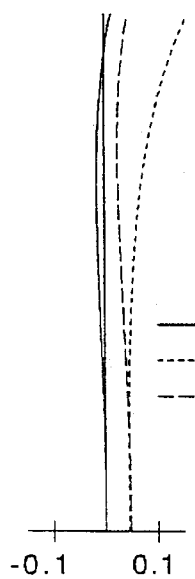
Fig. 5A
1:4.5
-0.1  0.1
SPHERICAL
ABERRATION
CHROMATIC
ABERRATION
—— d Line
----- g Line
— — C Line
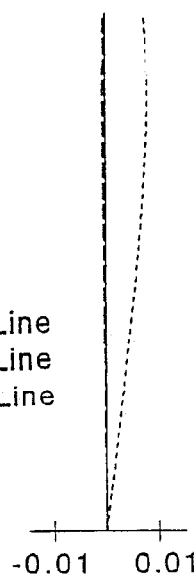
Fig. 5B
W=10.4
-0.01  0.01
LATERAL
CHROMATIC
ABERRATION
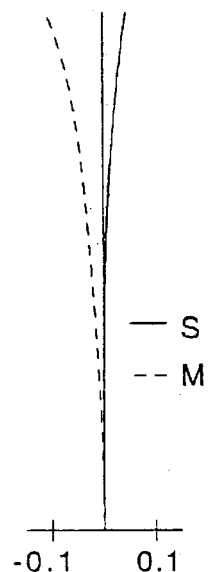
Fig. 5C
W=10.4
-0.1  0.1
ASTIGMATISM
—— S
-- M
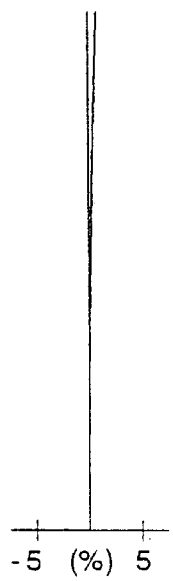
Fig. 5D
W=10.4
-5 (%) 5
DISTORTION Fig. 6
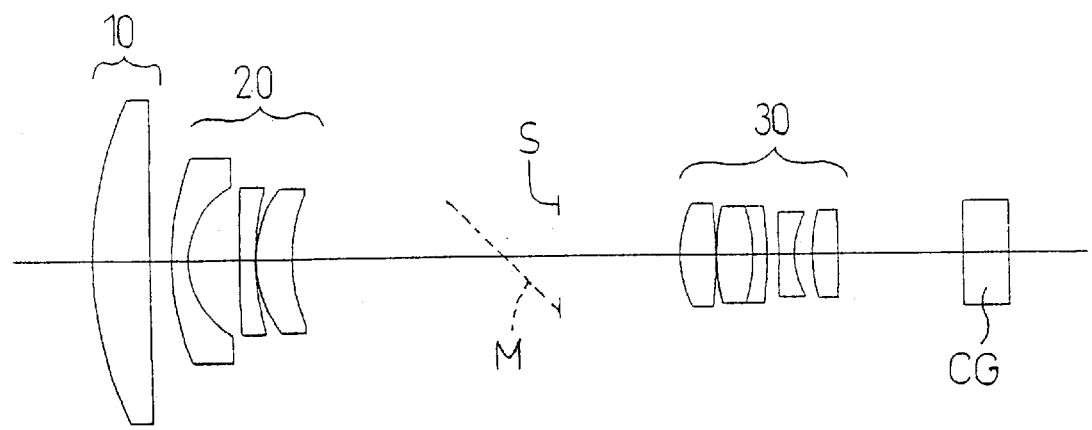
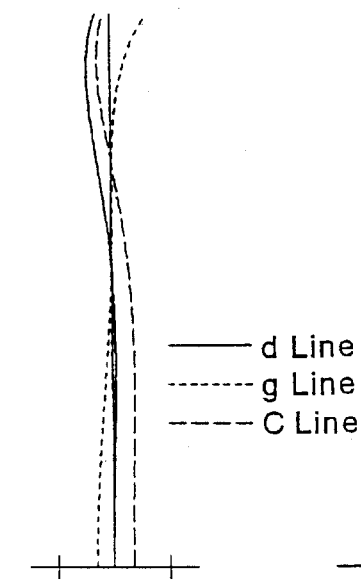
Fig. 7A
1:2.8
-0.1   0.1
SPHERICAL
ABERRATION
CHROMATIC
ABERRATION
— d Line
---- g Line
--- C Line
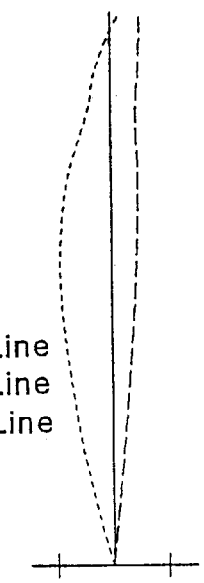
Fig. 7B
W=28.7
-0.01   0.01
LATERAL
CHROMATIC
ABERRATION
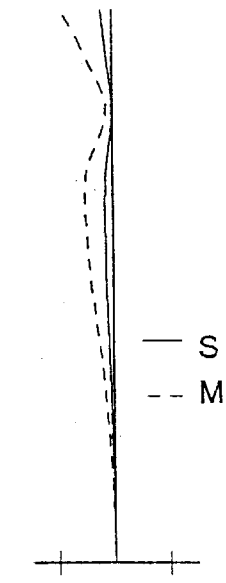
Fig. 7C
W=28.7
-0.1   0.1
ASTIGMATISM
— S
-- M
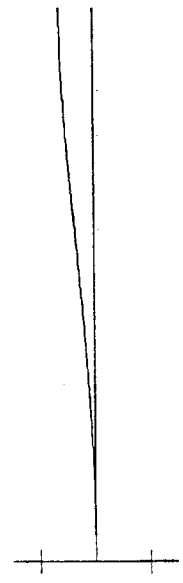
Fig. 7D
W=28.7
-5  (%)  5
DISTORTION Fig. 8
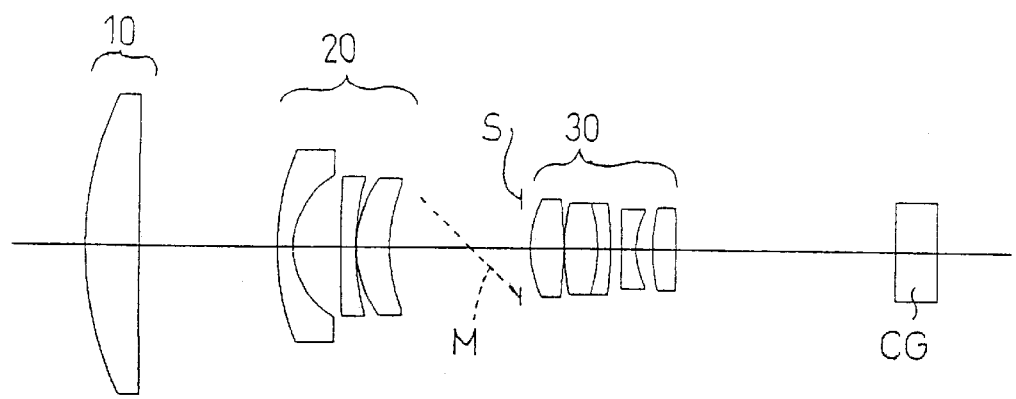
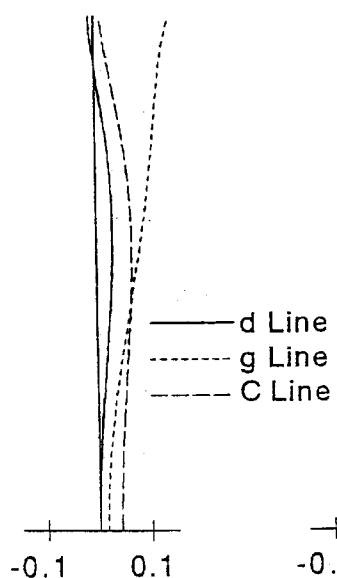
Fig. 9A
1:4.9
SPHERICAL
ABERRATION
CHROMATIC
ABERRATION
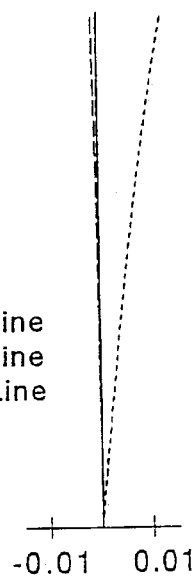
Fig. 9B
W=10.5
LATERAL
CHROMATIC
ABERRATION
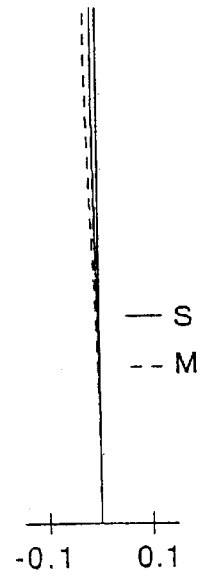
Fig. 9C
W=10.5
ASTIGMATISM
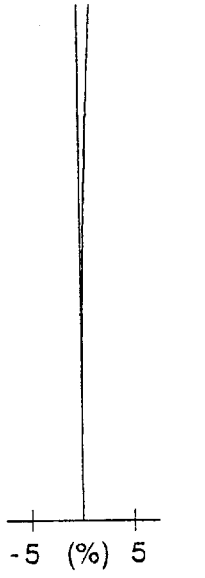
Fig. 9D
W=10.5
DISTORTION Fig. 12
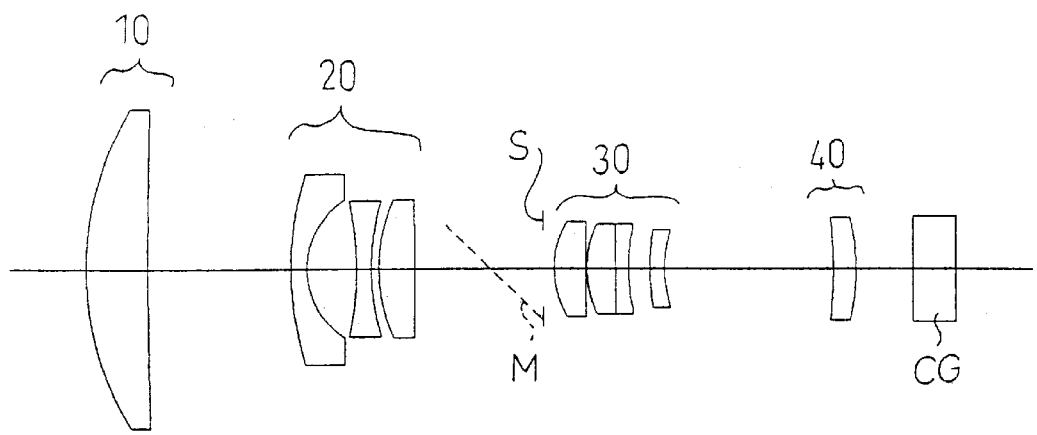
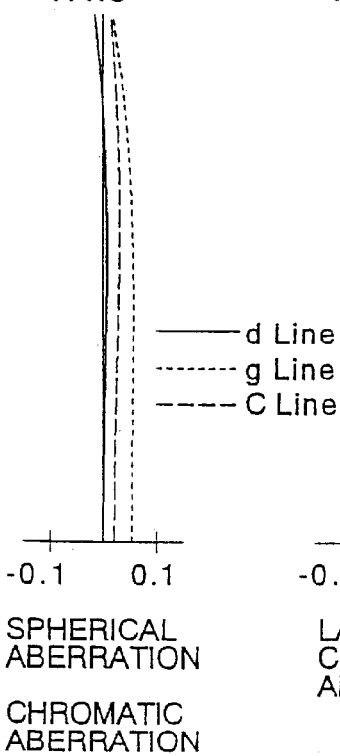
Fig.13A
1:4.8
SPHERICAL
ABERRATION
CHROMATIC
ABERRATION
— d Line
------ g Line
---- C Line
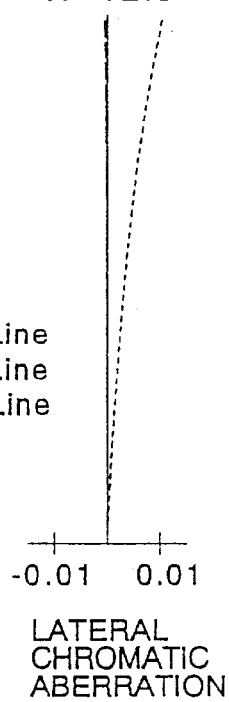
Fig.13B
W=12.3
LATERAL
CHROMATIC
ABERRATION
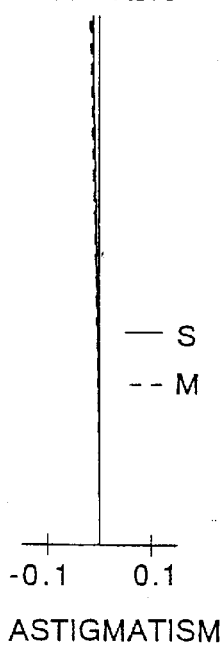
Fig.13C
W=12.3
ASTIGMATISM
— S
-- M
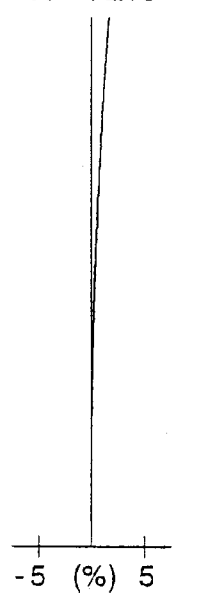
Fig.13D
W=12.3
DISTORTION Fig. 14
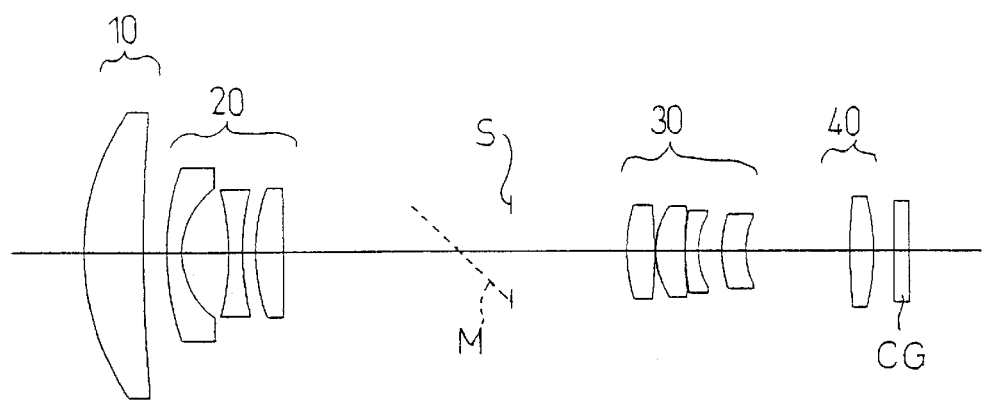
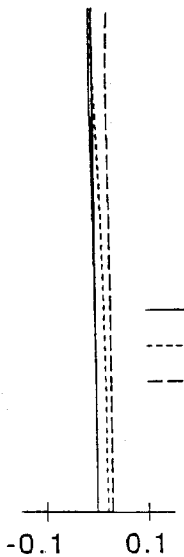
Fig.15A
1:2.8
——— d Line
------- g Line
---- C Line
-0.1   0.1
SPHERICAL
ABERRATION
CHROMATIC
ABERRATION
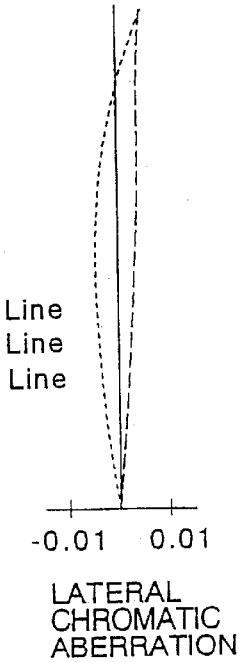
Fig.15B
W=30.0
-0.01   0.01
LATERAL
CHROMATIC
ABERRATION
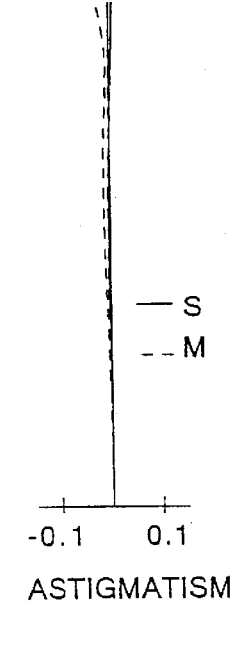
Fig.15C
W=30.0
—— S
-- M
-0.1   0.1
ASTIGMATISM
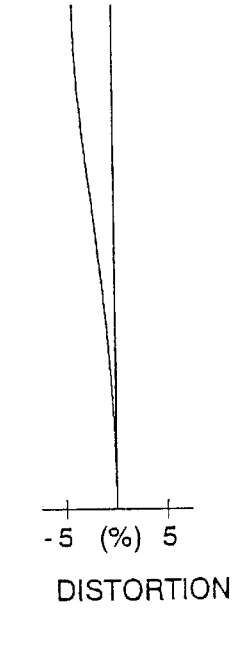
Fig.15D
W=30.0
-5  (%)  5
DISTORTION Fig. 16
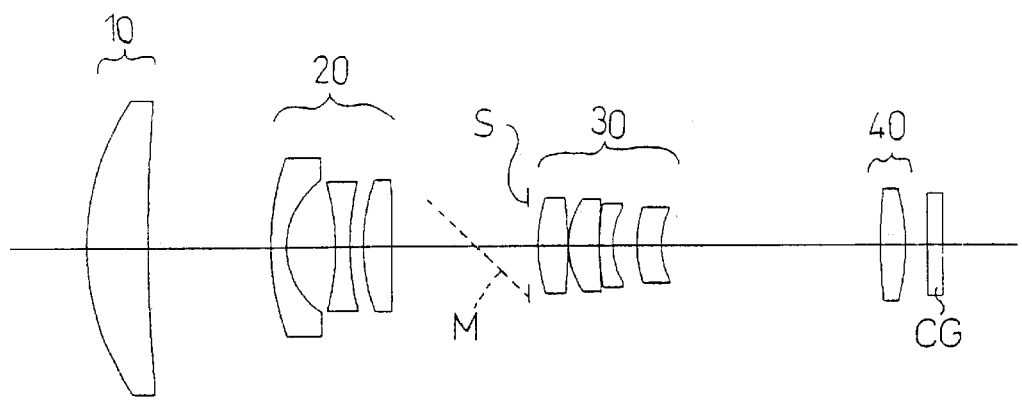
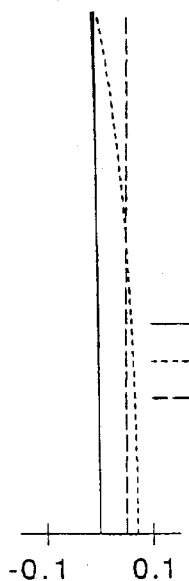
Fig. 17A
1:5.2
—— d Line
------ g Line
---- C Line
-0.1   0.1
SPHERICAL
ABERRATION
CHROMATIC
ABERRATION
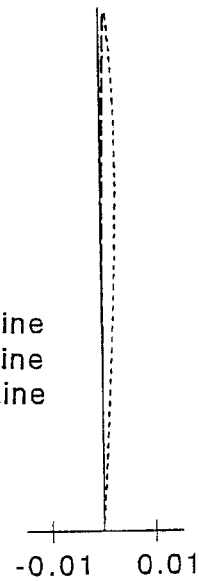
Fig. 17B
W=11.1
-0.01   0.01
LATERAL
CHROMATIC
ABERRATION
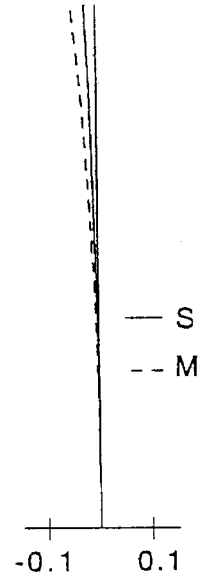
Fig. 17C
W=11.1
—— S
-- M
-0.1   0.1
ASTIGMATISM
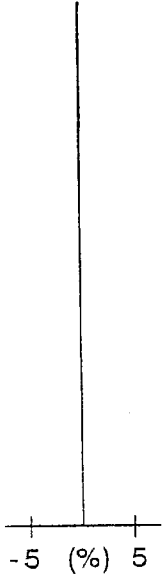
Fig. 17D
W=11.1
-5  (%)  5
DISTORTION Fig. 18
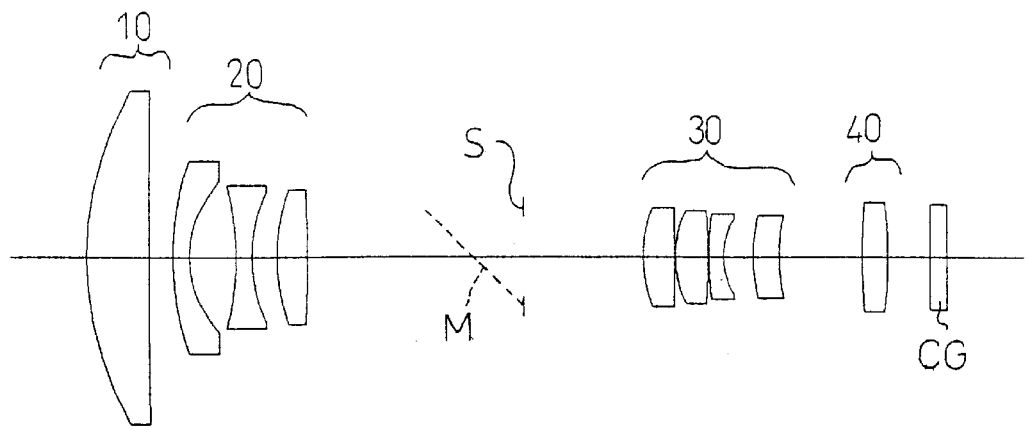
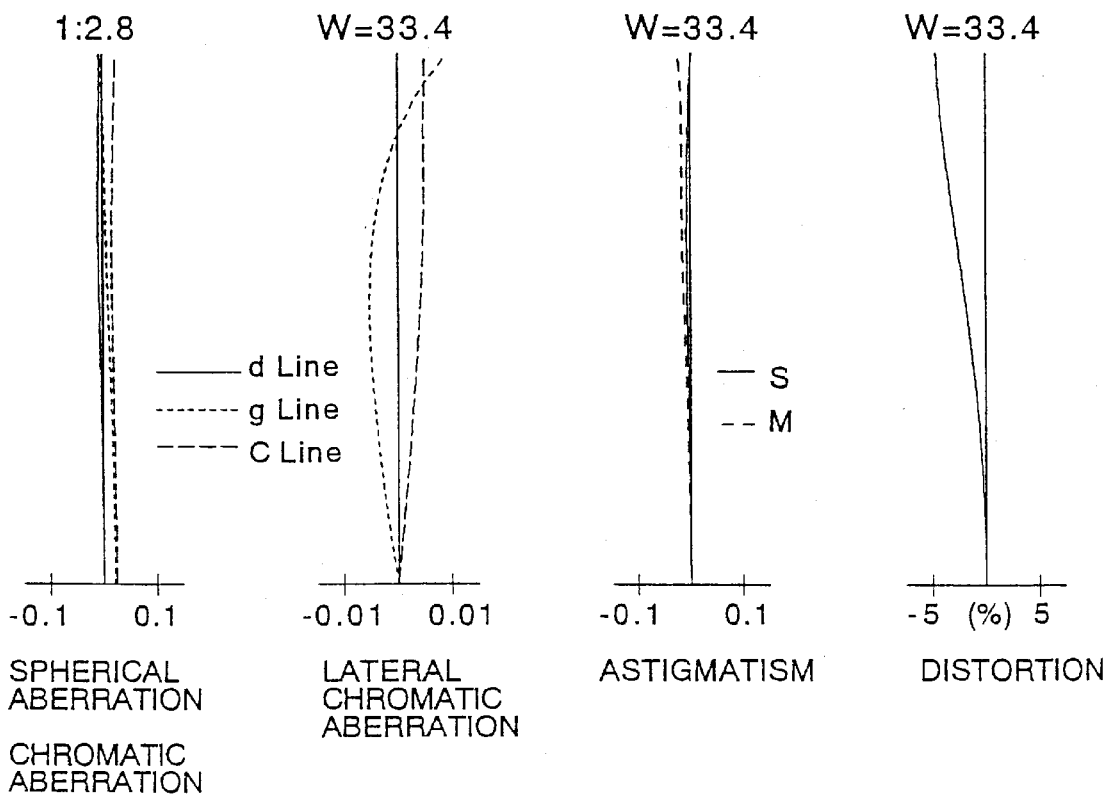
Fig.19A  Fig.19B  Fig.19C  Fig.19D
SPHERICAL ABERRATION
CHROMATIC ABERRATION
LATERAL CHROMATIC ABERRATION
ASTIGMATISM
DISTORTION Fig. 20
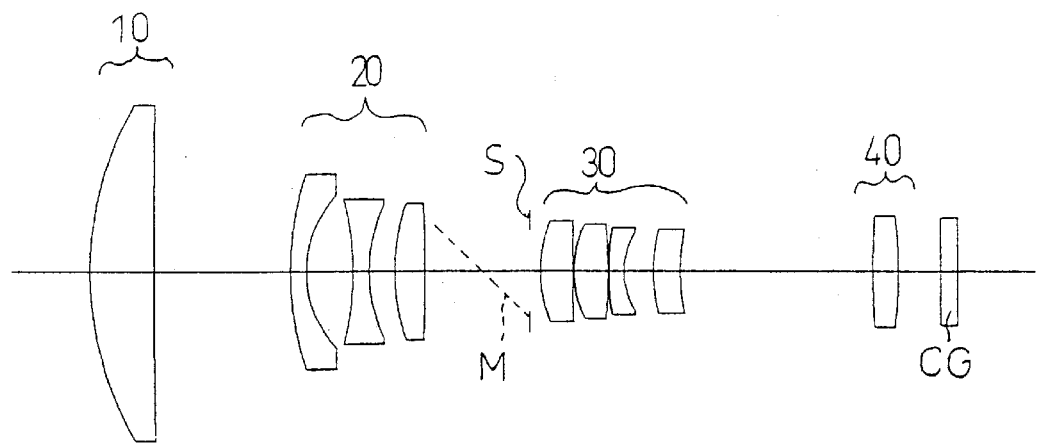
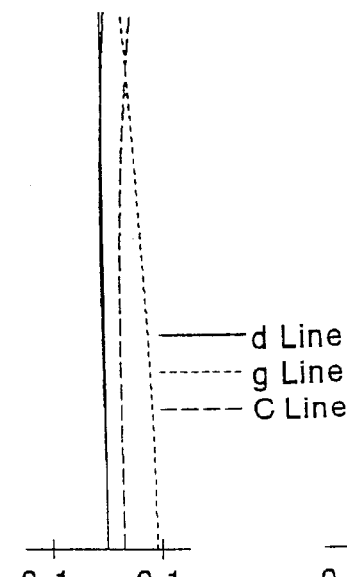
Fig.21A
1:5.1
SPHERICAL
ABERRATION
CHROMATIC
ABERRATION
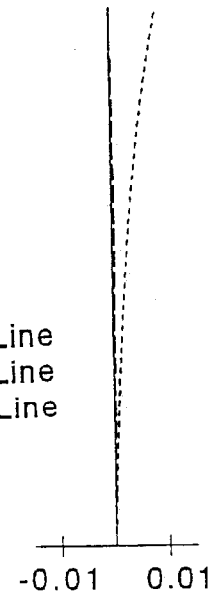
Fig.21B
W=12.4
LATERAL
CHROMATIC
ABERRATION
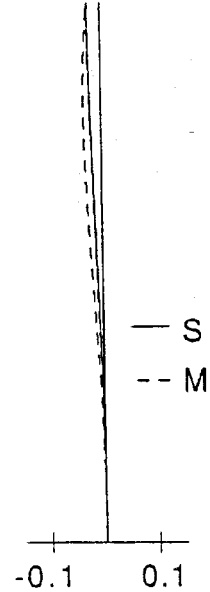
Fig.21C
W=12.4
ASTIGMATISM
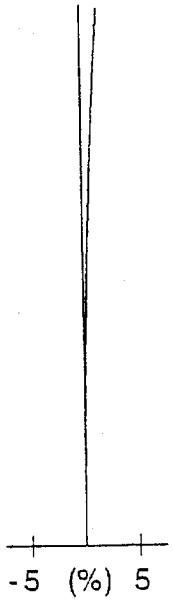
Fig.21D
W=12.4
DISTORTION

1:2.8

—— d Line
······ g Line
– – – C Line

-0.1  0.1

SPHERICAL
ABERRATION

CHROMATIC
ABERRATION

W=29.0

-0.01  0.01

LATERAL
CHROMATIC
ABERRATION

W=29.0

—— S
– – M

-0.1  0.1

ASTIGMATISM

W=29.0

-5 (%) 5

DISTORTION

Fig. 24
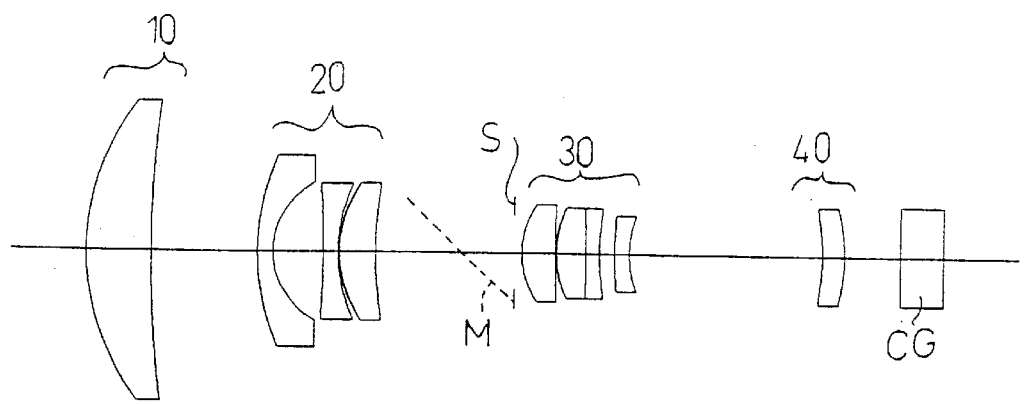
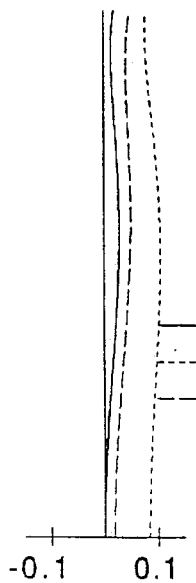
Fig.25A
1:5.4
— d Line
----- g Line
——— C Line
-0.1  0.1
SPHERICAL
ABERRATION
CHROMATIC
ABERRATION
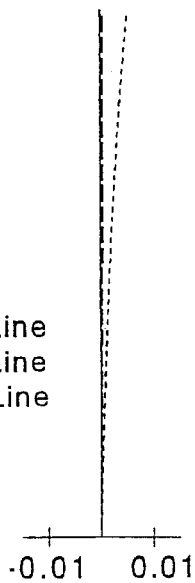
Fig.25B
W=10.7
-0.01  0.01
LATERAL
CHROMATIC
ABERRATION
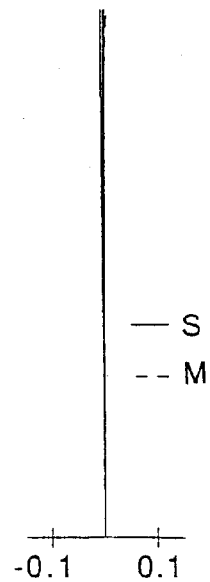
Fig.25C
W=10.7
— S
-- M
-0.1  0.1
ASTIGMATISM
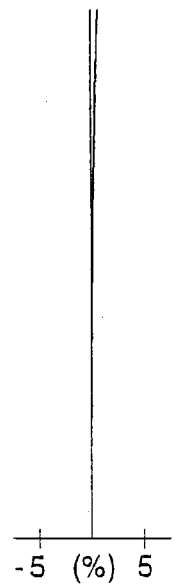
Fig.25D
W=10.7
-5  (%)  5
DISTORTION

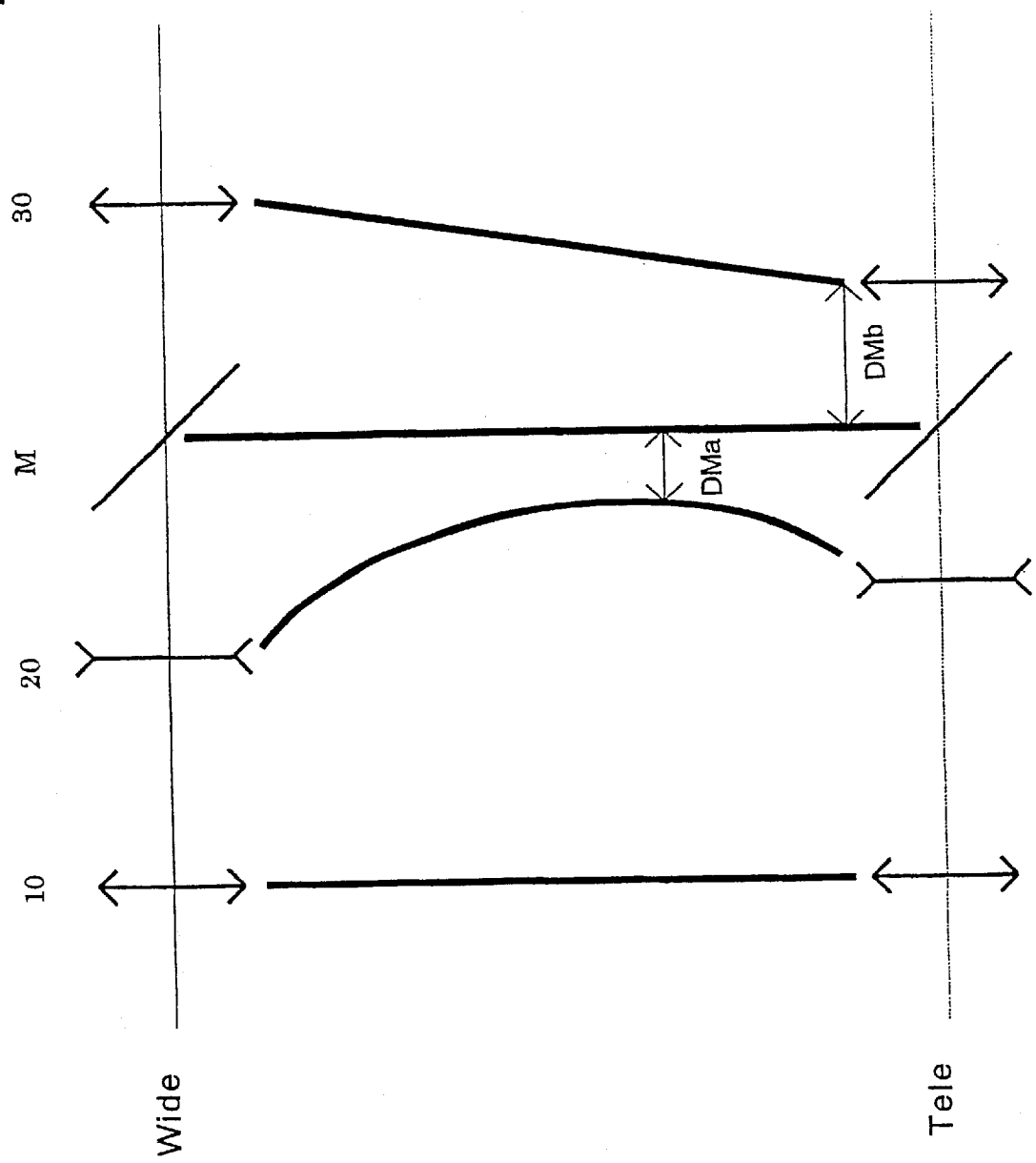

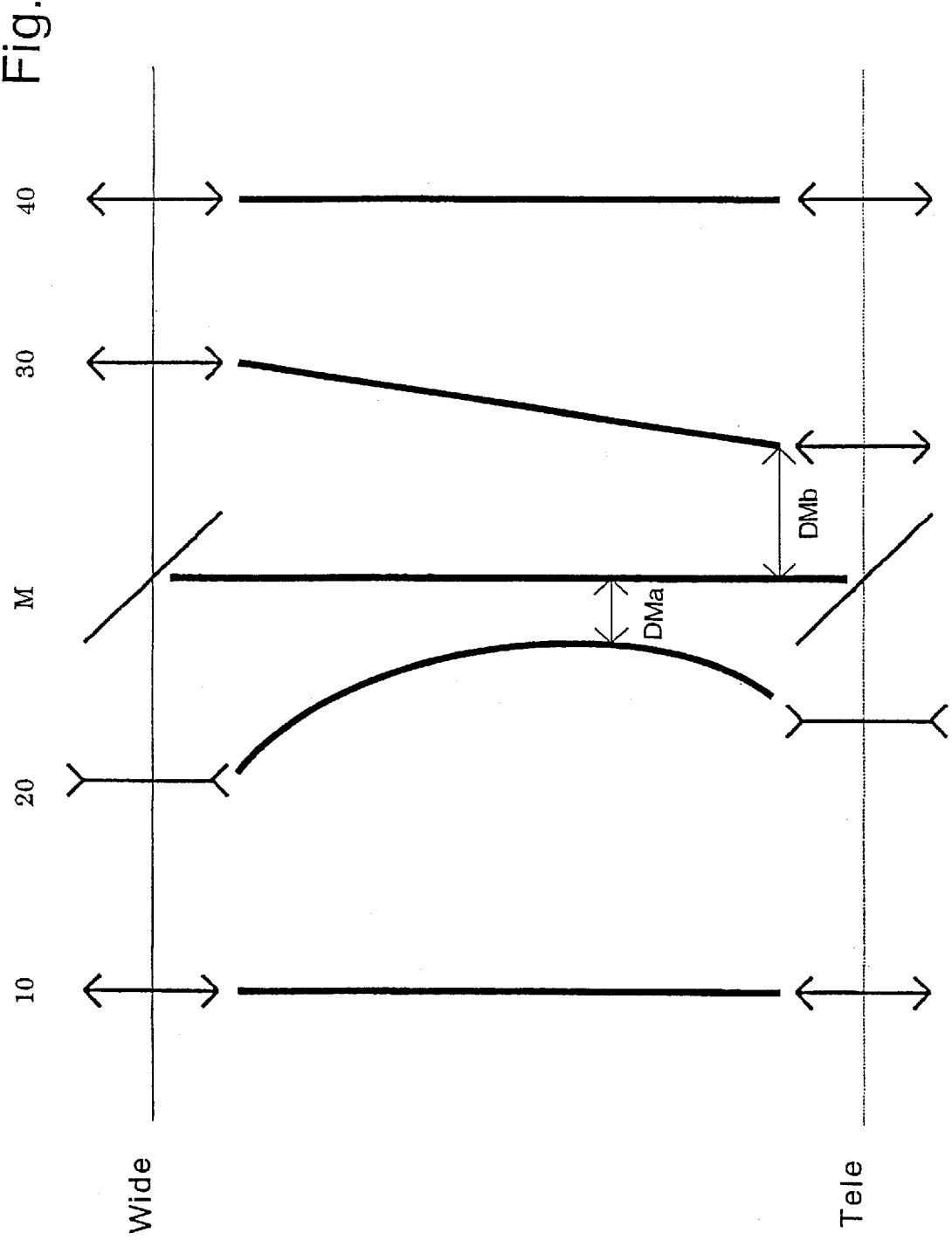

Fig. 29
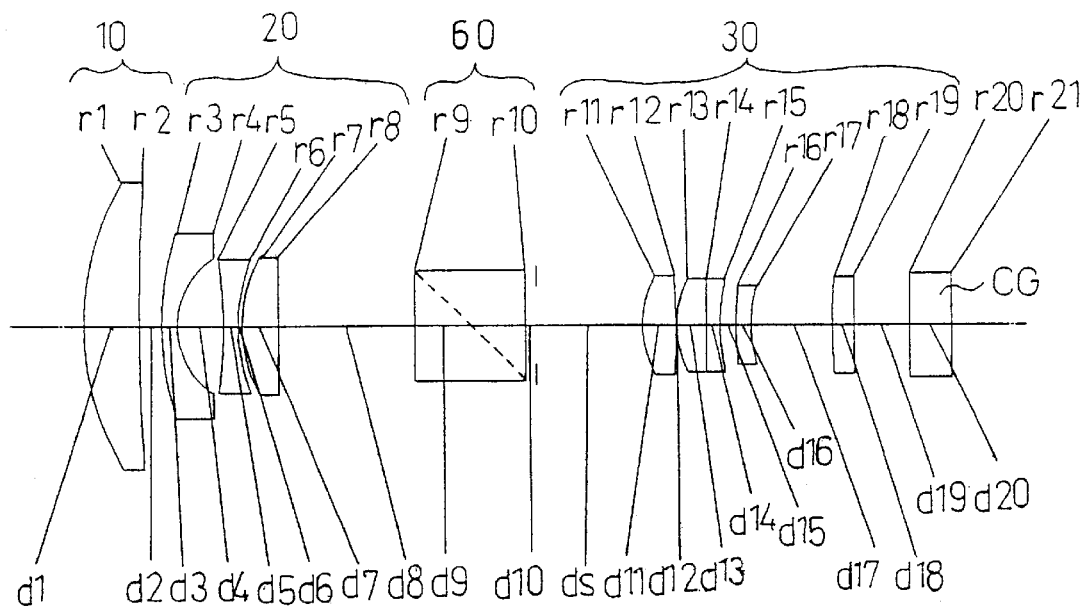
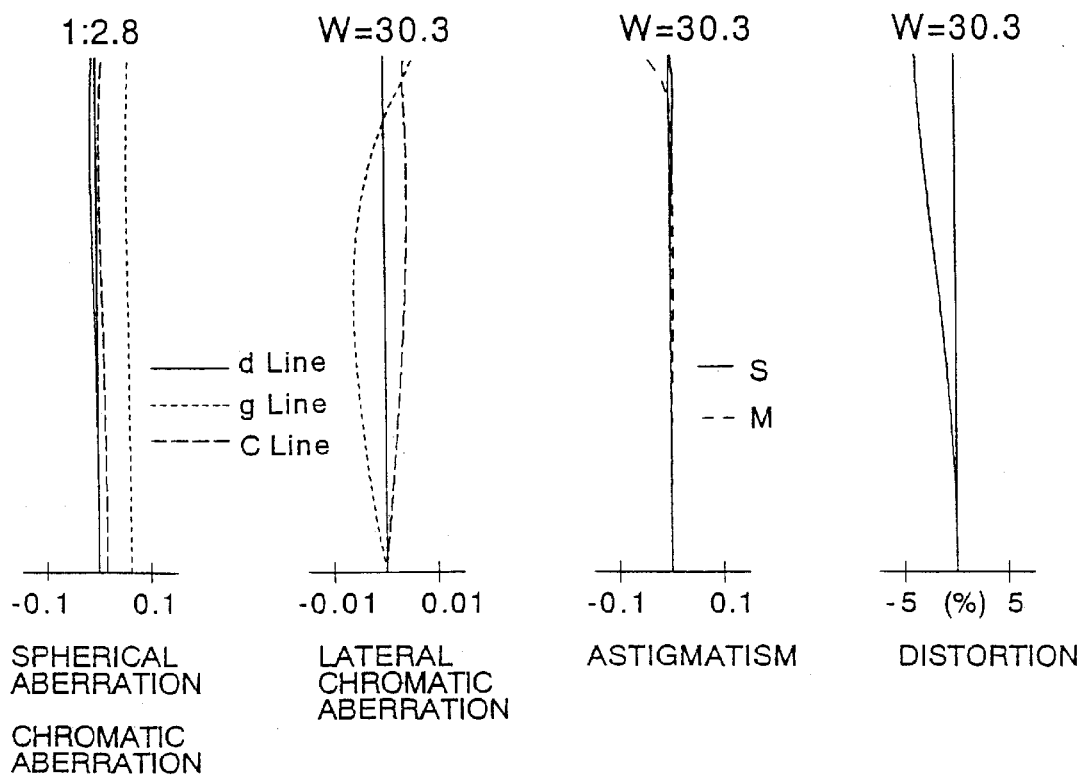
Fig.30A
1:2.8
Fig.30B
W=30.3
Fig.30C
W=30.3
Fig.30D
W=30.3
—— d Line
······ g Line
--- C Line
—— S
--- M
-0.1   0.1
SPHERICAL
ABERRATION
CHROMATIC
ABERRATION
-0.01   0.01
LATERAL
CHROMATIC
ABERRATION
-0.1   0.1
ASTIGMATISM
-5  (%)  5
DISTORTION Fig. 31
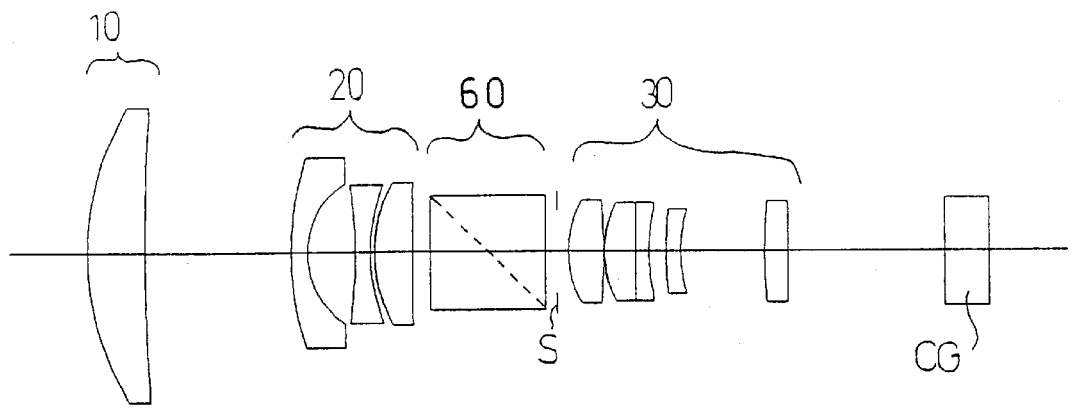
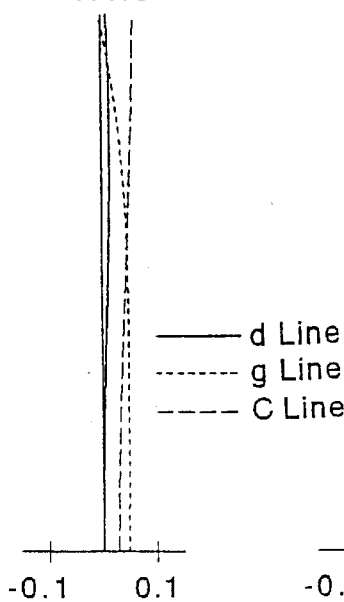
Fig.32A
1:4.6
—— d Line
----- g Line
--- C Line
-0.1   0.1
SPHERICAL
ABERRATION
CHROMATIC
ABERRATION
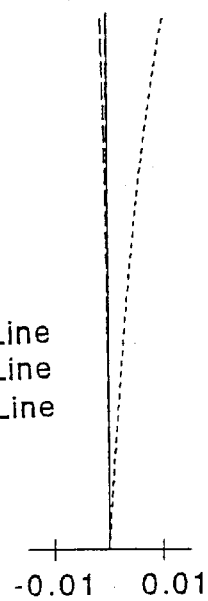
Fig.32B
W=11.1
-0.01   0.01
LATERAL
CHROMATIC
ABERRATION
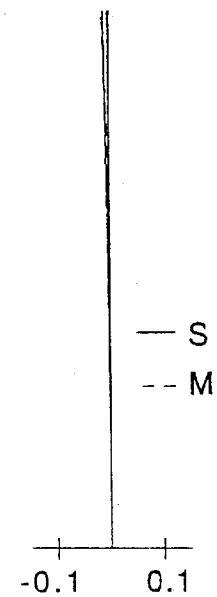
Fig.32C
W=11.1
— S
-- M
-0.1   0.1
ASTIGMATISM
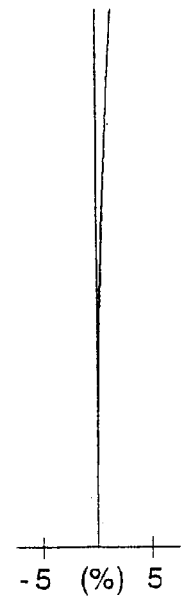
Fig.32D
W=11.1
-5  (%)  5
DISTORTION Fig. 33
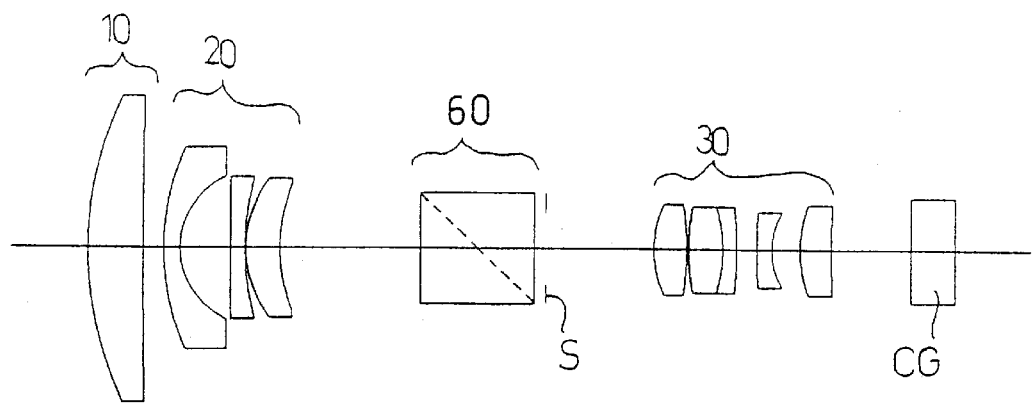
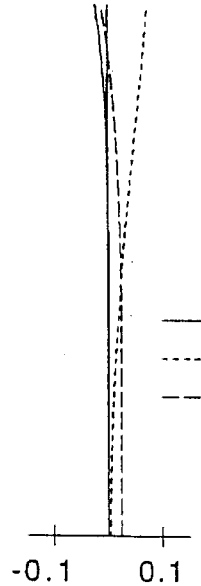
Fig.34A
1:2.8
SPHERICAL
ABERRATION
CHROMATIC
ABERRATION
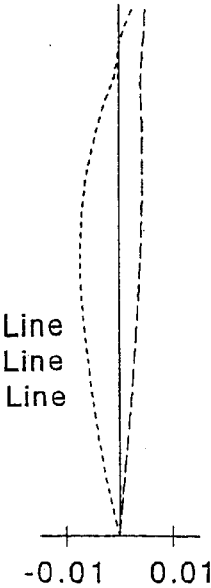
Fig.34B
W=30.3
—— d Line
······ g Line
– – C Line
LATERAL
CHROMATIC
ABERRATION
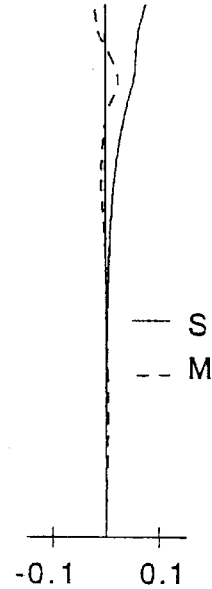
Fig.34C
W=30.3
—— S
– – M
ASTIGMATISM
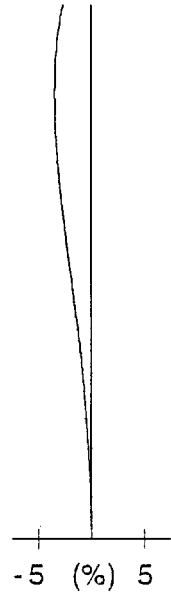
Fig.34D
W=30.3
DISTORTION

1:4.8

W=11.2

W=11.2

W=11.2

SPHERICAL ABERRATION

CHROMATIC ABERRATION

LATERAL CHROMATIC ABERRATION

ASTIGMATISM

DISTORTION

1:2.8

-0.1  0.1

SPHERICAL
ABERRATION

CHROMATIC
ABERRATION

W=33.0

——— d Line
------- g Line
---- C Line

-0.01  0.01

LATERAL
CHROMATIC
ABERRATION

W=33.0

——— S
--- M

-0.1  0.1

ASTIGMATISM

W=33.0

-5  (%)  5

DISTORTION

Fig. 39
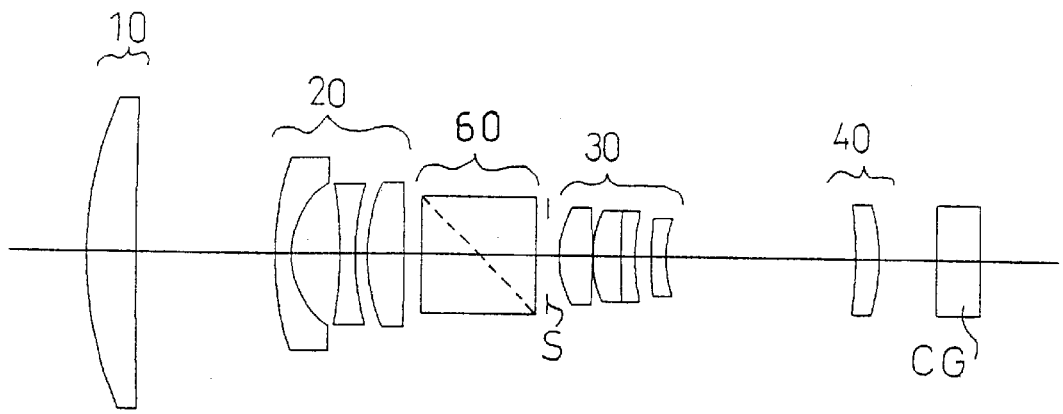
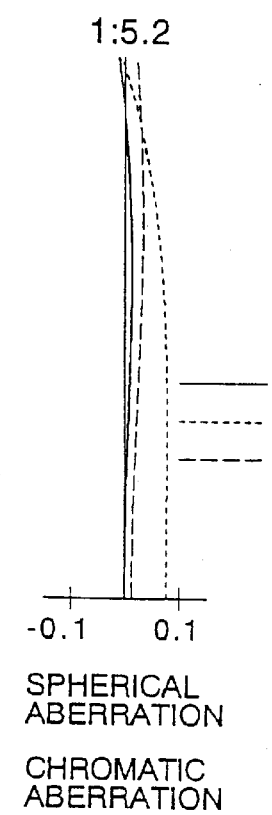
Fig.40A
1:5.2
— d Line
······ g Line
--- C Line
-0.1  0.1
SPHERICAL
ABERRATION
CHROMATIC
ABERRATION
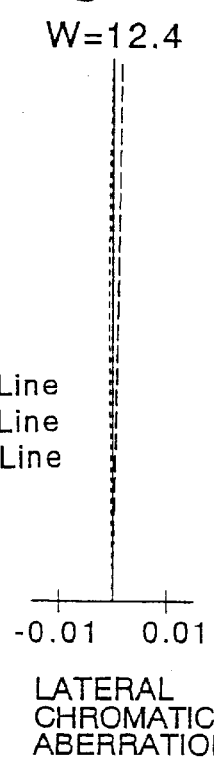
Fig.40B
W=12.4
-0.01  0.01
LATERAL
CHROMATIC
ABERRATION
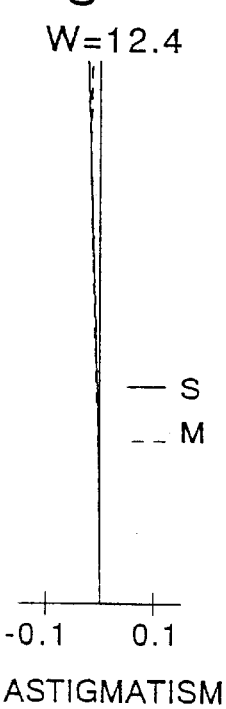
Fig.40C
W=12.4
— S
-- M
-0.1  0.1
ASTIGMATISM
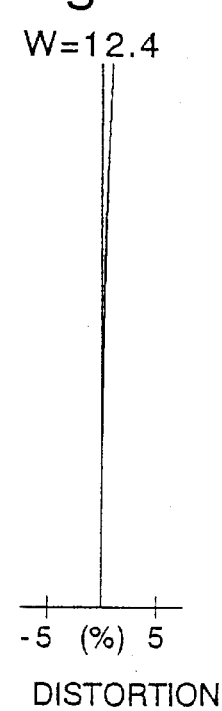
Fig.40D
W=12.4
-5 (%) 5
DISTORTION

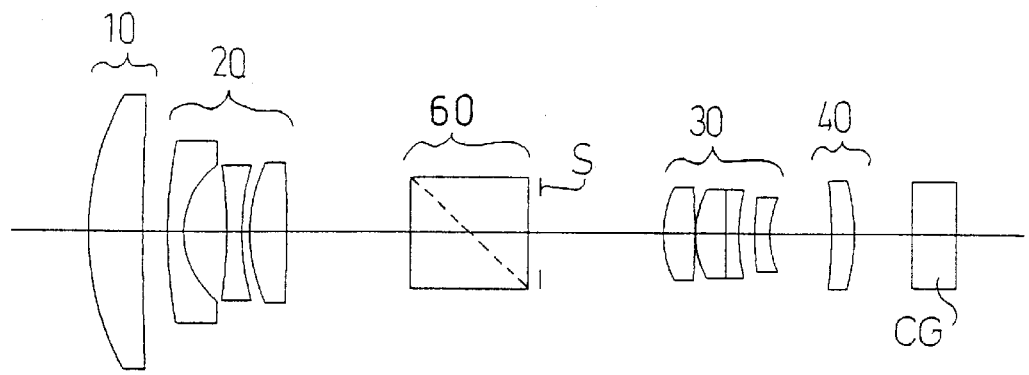
Fig. 41
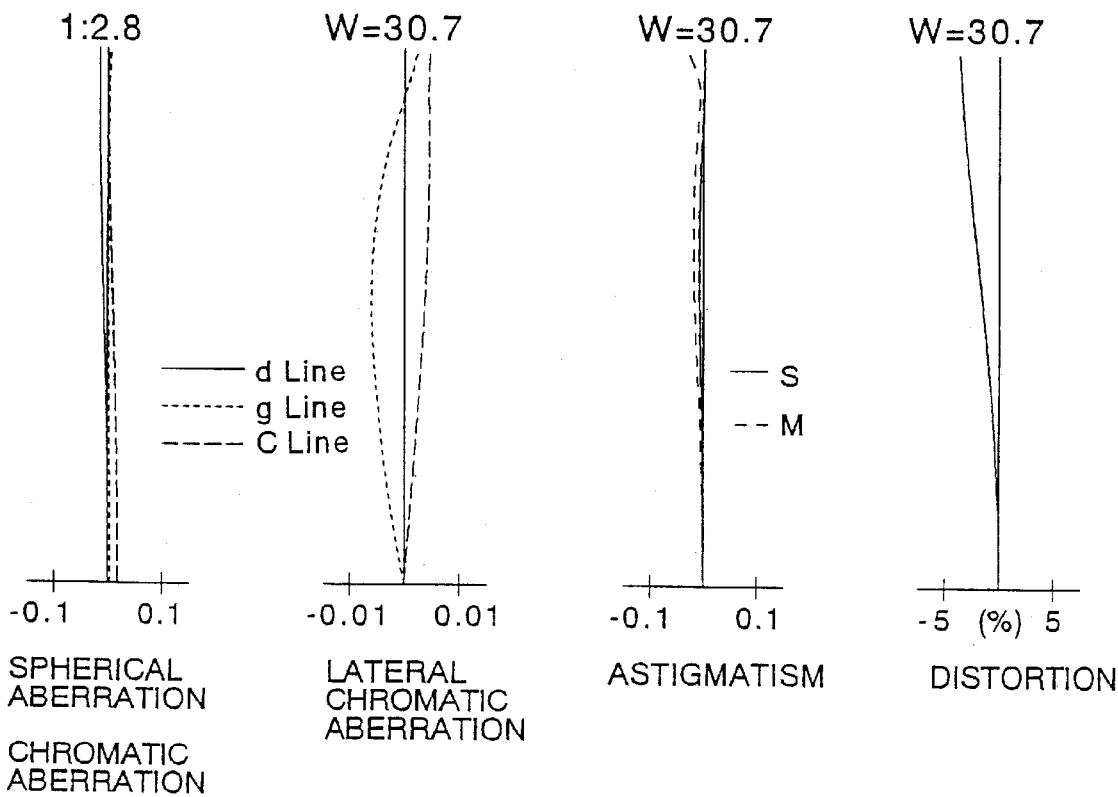
Fig.42A 1:2.8 SPHERICAL ABERRATION CHROMATIC ABERRATION
Fig.42B W=30.7 LATERAL CHROMATIC ABERRATION
Fig.42C W=30.7 ASTIGMATISM
Fig.42D W=30.7 DISTORTION

1:5.1   W=11.3   W=11.3   W=11.3

— d Line
---- g Line
---- C Line

— S
-- M

-0.1  0.1       -0.01  0.01      -0.1  0.1       -5 (%) 5

SPHERICAL      LATERAL         ASTIGMATISM      DISTORTION
ABERRATION     CHROMATIC
               ABERRATION
CHROMATIC
ABERRATION

ZOOM LENS SYSTEM

BACKGROUND OF THE INVENTION

1. Field of the Invention

The present invention relates to a zoom lens system to be used in a compact video camera or digital camera and the like.

2. Description of the Related Art

Generally, in a zoom lens system, it is necessary to maintain a space to allow the lens groups to move for zooming, as a result, the overall length of the zoom lens system tends to be long in comparison with a fixed focus lens system. Accordingly, there is a physical limit in reducing the dimensions of a camera body measured in a direction parallel with the optical axis of a lens system of the camera (hereinafter, the thickness of a camera).

In recent years, development has been made to produce digital cameras with higher resolution, and accordingly a frame size (an image size determined by a lens system) of an image pick-up device, such as a CCD (charge-coupled device), has been increased, and an optical system as well tends to be larger. For Miniaturizing a camera with a zoom lens system, a retractable type camera which is arranged to retract the lens barrel thereof when the main power is turned off is known. However, the mechanism of this retractable type camera is complicated, and is disadvantageous in regard to costs.

SUMMARY OF THE INVENTION

It is an object of the present invention to miniaturize a camera having a zoom lens system, in particular, to reduce the thickness of the camera.

In the present invention, the optical axis of a zoom lens system is deflected by a deflector (e.g., a mirror or a prism) in order reduce the thickness of the camera. Further, in the present invention, the deflector is selectively positioned in the zoom lens system.

In order to achieve the above mentioned object, there is provided a zoom lens system including a plurality of lens groups, and a deflector, being provided between lens groups which are made moveable upon zooming, for deflecting the optical axis of the zoom lens system.

The plurality of the lens groups preferably includes a positive first lens group, a negative second lens group, and a positive third lens group, in this order from the object. The zoom lens system is arranged to perform zooming by moving the second and third lens groups along the optical axis of the zoom lens system, and the deflector is positioned between the second and third lens groups.

The zoom lens system further includes a fourth lens group being provided on the image side of the positive third lens group.

In order to enhance the optical performance of the three-lens-group zoom lens system, the following conditions are preferably satisfied:

$$0.2 < \log_{10} Z_a / \log_{10} Z < 0.4 \quad (1)$$

$$0.2 < f_w / f_3 < 0.6 \quad (2)$$

$$-1.3 < m_{3t} < -0.8 \quad (3)$$

wherein $Z2 = M_{2t}/m_{2w}$ $Z = f_t/f_w$ $m_{2t}$ designates the transverse magnification of the second lens group at the long focal length extremity;

$m_{2w}$ designates the transverse magnification of the second lens group at the short focal length extremity;

$f_t$ designates the focal length of the entire lens system at the long focal length extremity;

$f_w$ designates the focal length of the entire lens system at the short focal length extremity;

$f_3$ designates the focal length of the third lens group; and $m_{3t}$ designates the transverse magnification of the third lens group at the long focal length extremity.

In order to enhance the optical performance of the four-lens-group zoom lens system, the following conditions are preferably satisfied:

$$0 < \log_{10} Z_2 / \log_{10} Z < 0.4 \quad (1)$$

$$0.2 < f_w / f_{(3-4)w} < 0.6 \quad (2)$$

$$-1.3 < m_{3t} < -0.8 \quad (3)$$

wherein $Z_2 = m_{2t}/m_{2w}$ $Z = f_t/f_w$ $m_{2t}$ designates the transverse magnification of the second lens group at the long focal length extremity;

$m_{2w}$ designates the transverse magnification of the second lens group at the short focal length extremity;

$f_t$ designates the focal length of the entire lens system at the long focal length extremity;

$f_w$ designates the focal length of the entire lens system at the short focal length extremity;

$f_{(3-4)w}$ designates the resultant focal length of the third lens group and the fourth lens group at short focal length extremity; and $m_{3t}$ designates the transverse magnification of the third lens group at the long focal length extremity.

In the zoom lens system, the deflector is preferably a mirror.

In order to suitably position the mirror, the zoom lens system preferably satisfies the following condition:

$$0.25 < DM_{min}/f_t < 0.8 \quad (4)$$

wherein $DM_{min} = DMa + DMb$

DMa designates the minimum distance from the lens group immdiately before the mirror to the center of the mirror which is defined as the intersecting point where the optical axis meets the reflection surface of the mirror;

DMb designates the minimum distance from the center of the mirror to the lens group immediately behind the mirror; and $f_t$ designates the focal length of the entire lens system at the long focal length extremity.

In the zoom lens system, the deflector is preferably a prism.

In order to suitably position the prism, the zoom lens system preferably satisfies the following condition:

$$0.8 < DP_{min}/2y < 1.5 \quad (5)$$

wherein $DP_{min} = DPa + (Lp/Np) + DPb$

DPa designates the minimum distance from the lens group immediately before the prism to the prism;

Lp designates the axial thickness of the prism along the optical axis;

Np designates the refractive index of the prism;

DPb designates the minimum distance from the prism to the lens group immediately behind the prism; and 2y designates the image size determined by the optical system (y=f×tan W; f: the focal length of the entire lens system; W: the half angle-of-view).

Further, the zoom lens system preferably satisfies the following condition:

$$0.25 < DP_{min}f_t < 0.8 \qquad (6)$$

wherein $f_t$ designates the focal length of the entire lens system at the long focal length extremity.

The present disclosure relates to subject matters contained in Japanese Patent Application No. Hei-10-365721 (filed on Dec. 22, 1998) and Japanese Patent Application No. Hei-10-365722 (filed on Dec. 22, 1998) which are expressly incorporated herein by reference in their entirety.

BRIEF DESCRIPTION OF THE DRAWINGS

The invention will be discussed below in detail with reference to the accompanying drawings, in which

FIG. 2 is; a lens arrangement, at the short focal length extremity, of a zoom lens system according to a first embodiment, and a deflector (a mirror) is shown as a developed view;

FIGS. 3A, 3B, 3C and 3D are aberration diagrams of the lens arrangement shown in FIG. 2;

FIG. 4 is the lens arrangement, at the long focal length extremity, of the zoom lens system according to the first embodiment;

FIGS. 5A, 5B, 5C and 5D are aberration diagrams of the lens arrangement shown in FIG. 4;

FIG. 6 is a lens arrangement, at the short focal length extremity, of a zoom lens system according to a second embodiment, and a deflector (a mirror) is shown as a developed view;

FIGS. 7A, 7B, 7C and 7D are aberration diagrams of the lens arrangement shown in FIG. 6;

FIG. 8 is the lens arrangement, at the long focal length extremity, of the zoom lens system according to the second embodiment;

FIGS. 9A, 9B, 9C and 9D are aberration diagrams of the lens arrangement shown in FIG. 8;

FIG. 12 is the lens arrangement, at the long focal length extremity, of the zoom lens system according to the third embodiment;

FIGS. 13A, 13B, 13C and 13D are aberration diagrams of the lens arrangement shown in FIG. 12;

FIG. 14 is a lens arrangement, at the short focal length extremity, of a zoom lens system according to a fourth embodiment, and a deflector (a mirror) is shown as a developed view;

FIGS. 15A, 15B, 15C and 15D are aberration diagrams of the lens arrangement shown in FIG. 14;

FIG. 16 is the lens arrangement, at the long focal length extremity, of the zoom lens system according to the fourth embodiment;

FIGS. 17A, 17B, 17C and 17D are aberration diagrams of the lens arrangement shown in FIG. 16;

FIG. 18 is a lens arrangement, at the short focal length extremity, of a zoom lens system according to a fifth embodiment and a deflector (a mirror) is shown as a developed view;

FIGS. 19A, 19B, 19C and 19D are aberration diagrams of the lens arrangement shown in FIG. 18;

FIG. 20 is the lens arrangement, at the long focal length extremity, of the zoom lens system according to the fifth embodiment;

FIGS. 21A, 21B, 21C and 21D are aberration diagram of the lens arrangement shown in FIG. 20;

FIG. 24 is the lens arrangement, at the long focal length extremity, of the zoom lens system according to the sixth embodiment;

FIGS. 25A, 25B, 25C and 25D are aberration diagrams of the lens arrangement shown in FIG. 24;

FIG. 26 shows lens-group moving paths of a zoom lens system, with the mirror, having a three-lens-group arrangement according to the present invention;

FIG. 27 shows lens-group moving paths of a zoom lens system, with the mirror, having a four-lens-group arrangement according to the present invention;

FIG. 29 is a lens arrangement, at the short focal length extremity, of a zoom lens system according to a seventh embodiment, and a deflector (a prism) is shown as a developed view;

FIGS. 30A, 30B, 30C and 30D are aberration diagrams of the lens arrangement shown in FIG. 29;

FIG. 31 is the lens arrangement, at the long focal length extremity, of the zoom lens system according to the seventh embodiment;

FIGS. 32A, 32B, 32C and 32D are aberration diagrams of the lens arrangement shown in FIG. 31;

FIG. 33 is a lens arrangement, at the short focal length extremity, of a zoom lens system according to an eighth embodiment, and a deflector (a prism) is shown as a developed view;

FIGS. 34A, 34B, 34C and 34D are aberration diagrams of the lens arrangement shown in FIG. 33;

FIG. 39 is the lens arrangement, at the long focal length extremity, of the zoom lens system according to the ninth embodiment;

FIGS. 40A, 40B, 40C and 40D are aberration diagrams of the lens arrangement shown in FIG. 39;

FIG. 41 is a lens arrangement, at the short focal length extremity, of a zoom lens system according to a tenth embodiment, and a deflector (a prism) is shown as a developed view;

FIGS. 42A, 42B, 42C and 42D are aberration diagrams of the lens arrangement shown in FIG. 41;

DESCRIPTION OF THE PREFERRED EMBODIMENTS

Figure 1:
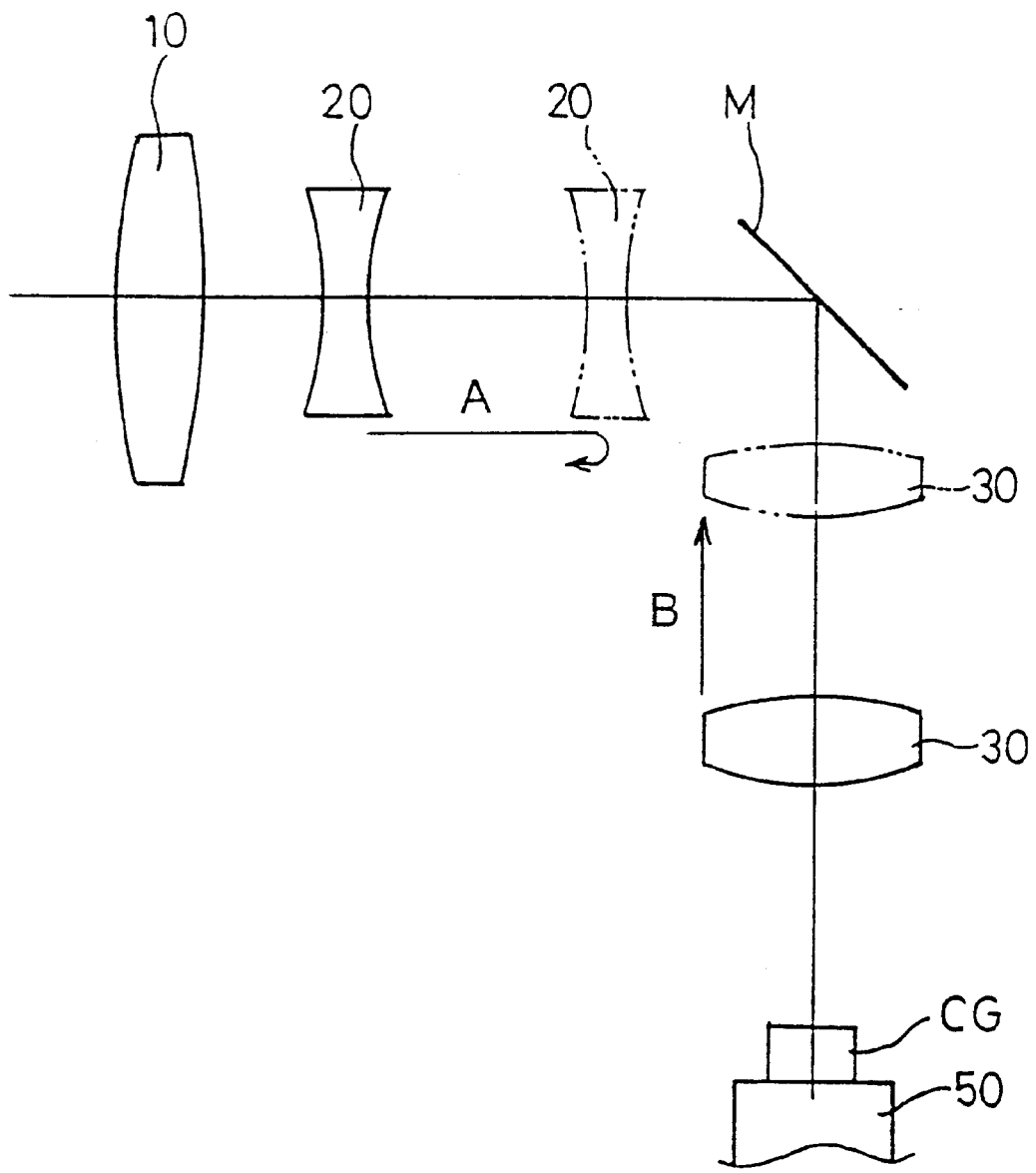
FIG. 1 is a basic structure of a zoom lens system according to the present invention.
Figure 28:
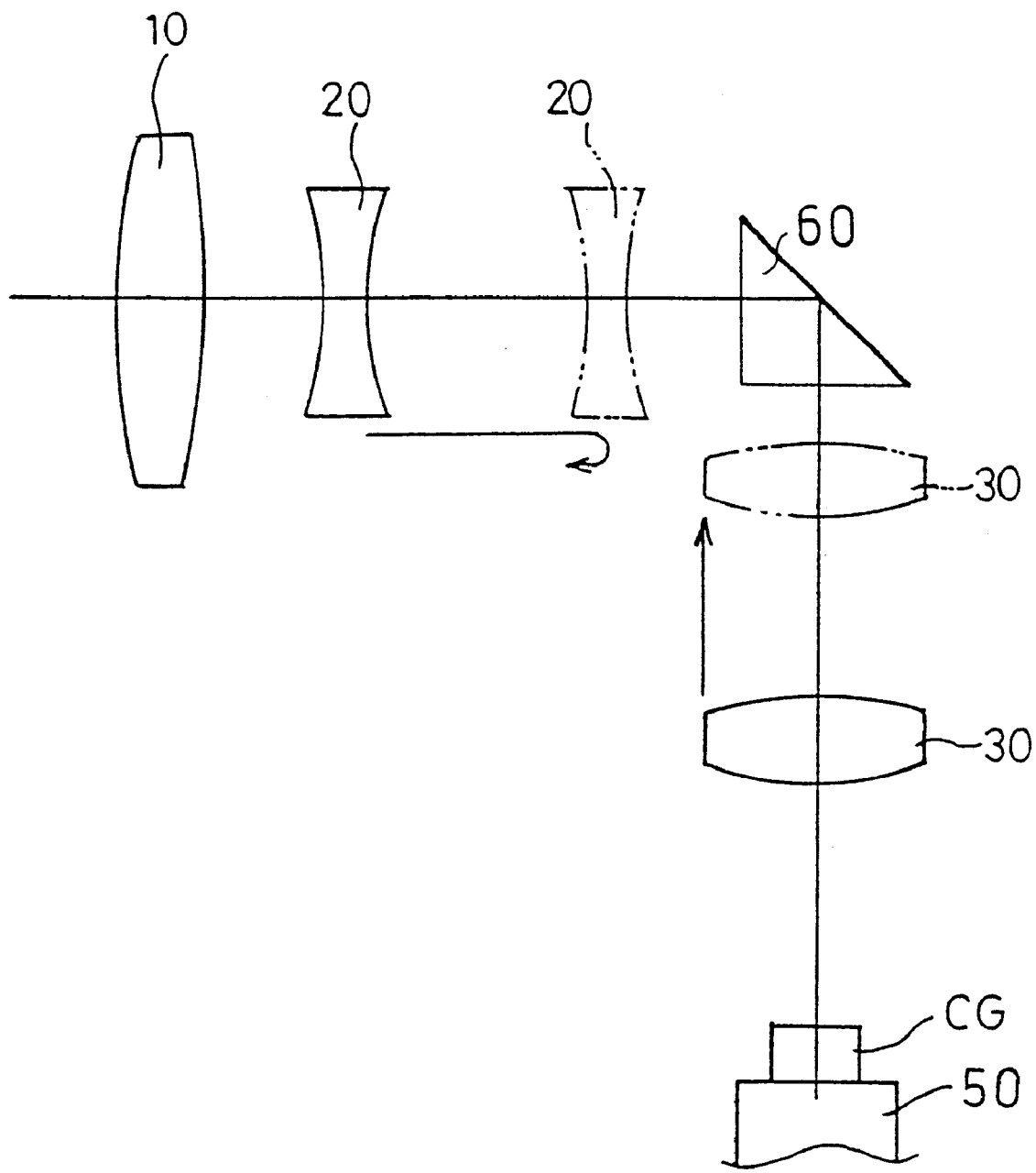
FIG. 28 is another basic structure of a zoom lens system according to the present invention.

FIG. 1 and FIG. 28 respectively show embodiments of a zoom lens system in which a plurality of lens groups are provided, and a deflector is provided between lens groups being made moveable upon zooming. In FIG. 1, the deflector is a mirror; and in FIG. 28, the deflector is a prism.

FIGS. 1 through 27 show the zoom lens systems with a mirror as a deflector.

FIG. 1 shows a three-lens-group zoom lens system including a positive first lens group 10, a negative second lens group 20, and a positive third lens group 30, in this order from the object. A immovable (i.e.,fixed) mirror M is provided between the second lens group 20 and the third lens group 301 and deflects the optical axis by 90°. Zooming is performed by moving the second lens group 20 and the third lens group 30 along the optical axis. In other words, the mirror M is provided between the lens groups which are made moveable upon zooming. Further, as shown in FIG. 1, an image pick-up device 50 provided with a cover glass CG is placed on the image forming plane of the zoom lens system. FIG. 26 shows the lens-group moving paths of the three-lens-group zoom lens system shown in FIG. 1.

Figure 10:
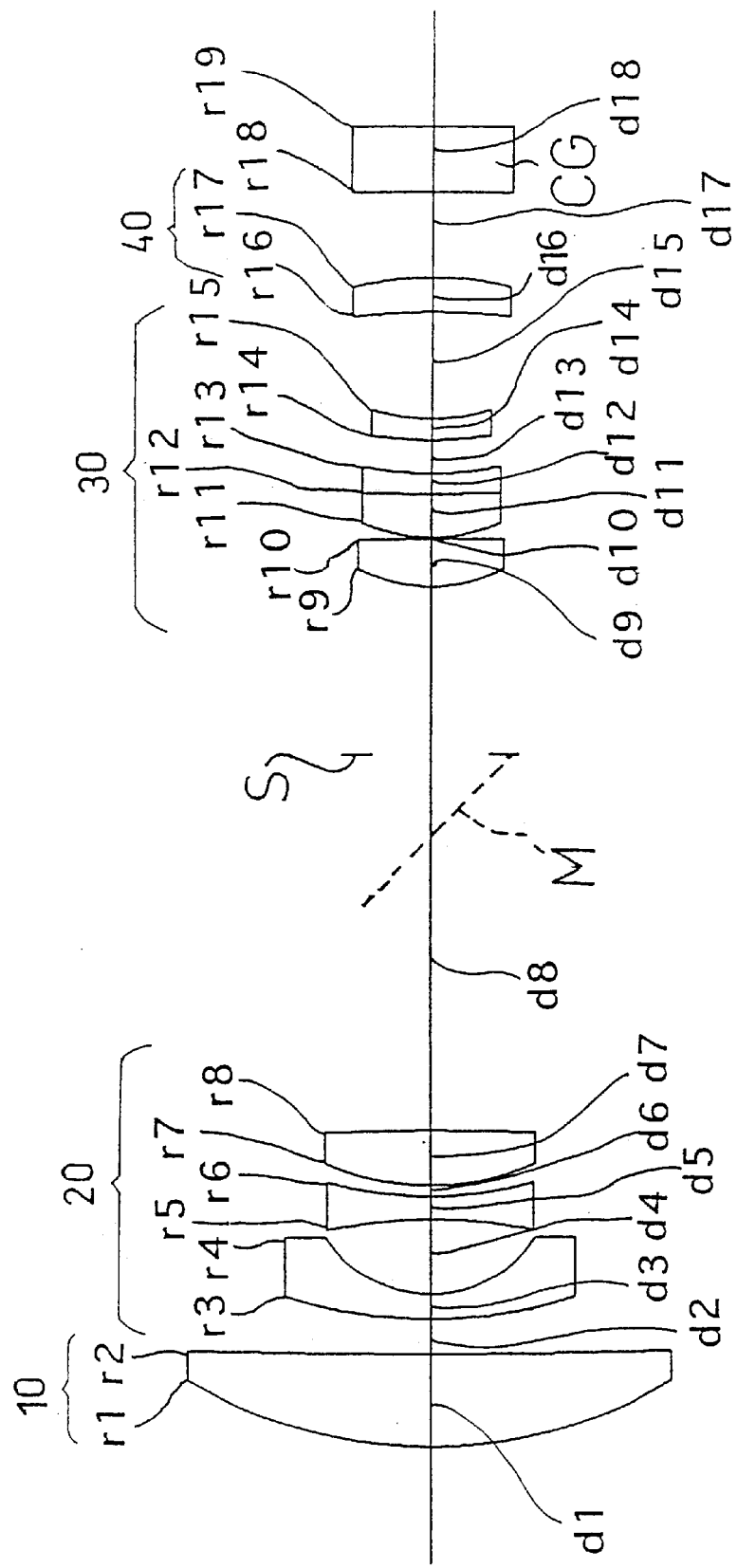
FIG. 10 is a lens arrangement, at the short focal length extremity, of a zoom lens system according to a third embodiment, and a deflector (a mirror) is shown as a developed view.
Figure 11:
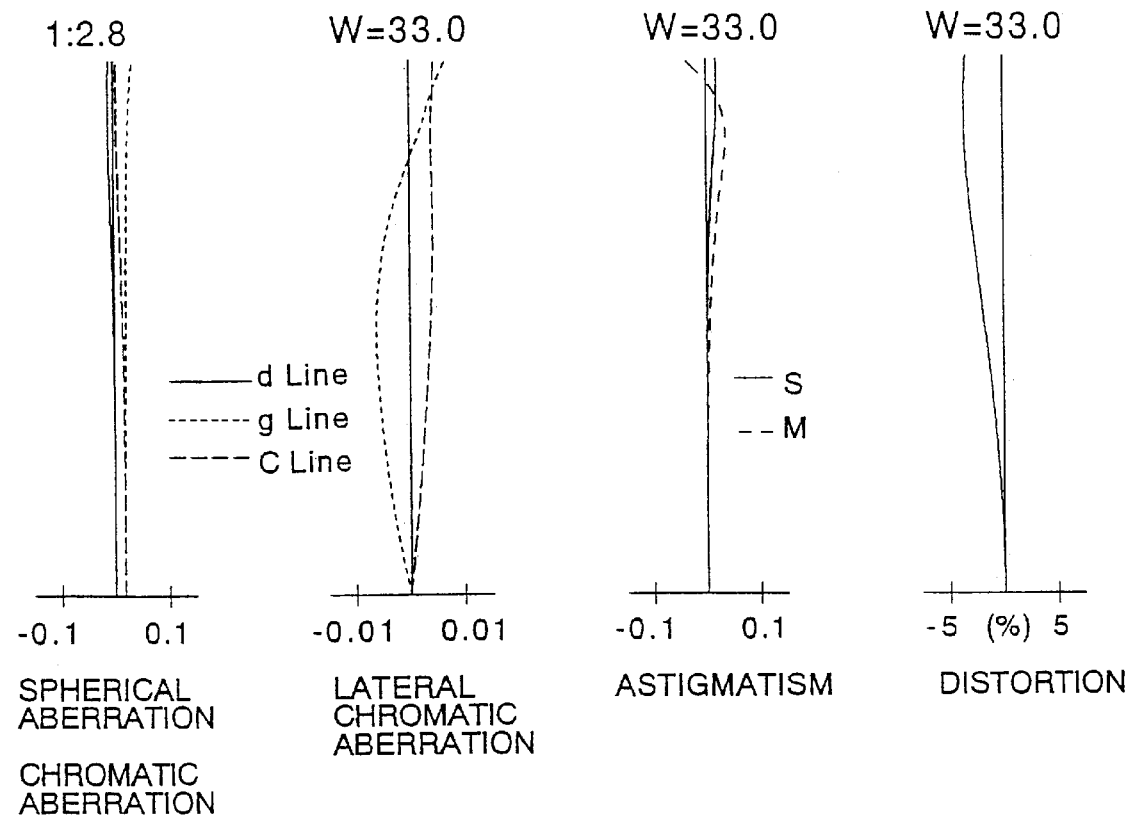
FIGS. 11A, 11B, 11C and 11D are aberration diagrams of the lens arrangement shown in FIG. 10.

FIG. 10 shows a four-lens-group zoom lens system. The fourth lens group is made immovable upon zooming, as relatively weak power, and is added behind the third lens group of the three-lens-group zoom lens system. Accordingly, telecentriicity which is required when an image pick-up device, such as a CCD, is used is easily attained. FIG. 27 shows the lens-group moving paths of the four-lens-group zoom lens system including the positive first lens group 10, the negative second lens group 20, the mirror M, the positive third lens group 30, and the positive fourth lens group 40, in this order from the object.

FIGS. 28 through 46 show a zoom lens system with a prism as a deflector.

Figure 45:
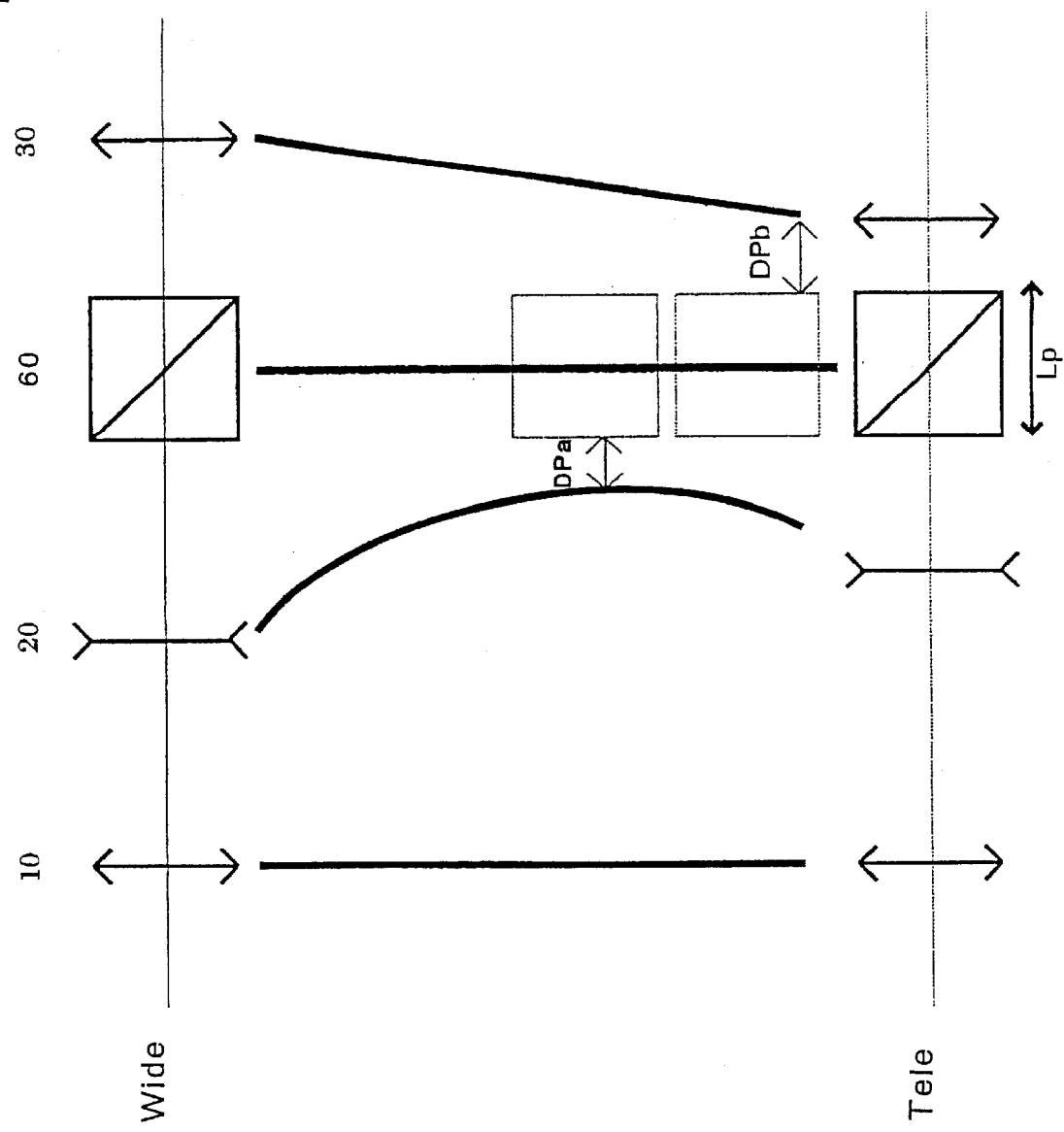
FIG. 45 shows lens-group moving paths of a zoom lens system, with the prism, having a three-lens-group arrangement according to the present invention.

FIG. 28 shows a three-lens-group zoom lens system including a positive first lens group 10, a negative second lens group 20, and a positive third lens group 30, in this order from the object. A prism 60 is provided, and made immovable (i.e., fixed), between the second lens group 20 and the third lens group 30, and deflects the optical axis by 90°. Adjustment on decenteration of the optical system can be performed by the prism 60. Zooming is performed by moving the second lens group 20 and the third lens group 30 along the optical axis. In other words, the prism 60 is provided between the lens groups which are made moveable upon zooming. Further, as shown in FIG. 28, an image pick-up device 50 provided with a cover glass CG is placed on the image forming plane of the zoom lens system. FIG. 45 shows the lens group moving paths of the three-lens-group zoom lens system shown in FIG. 1.

Figure 37:
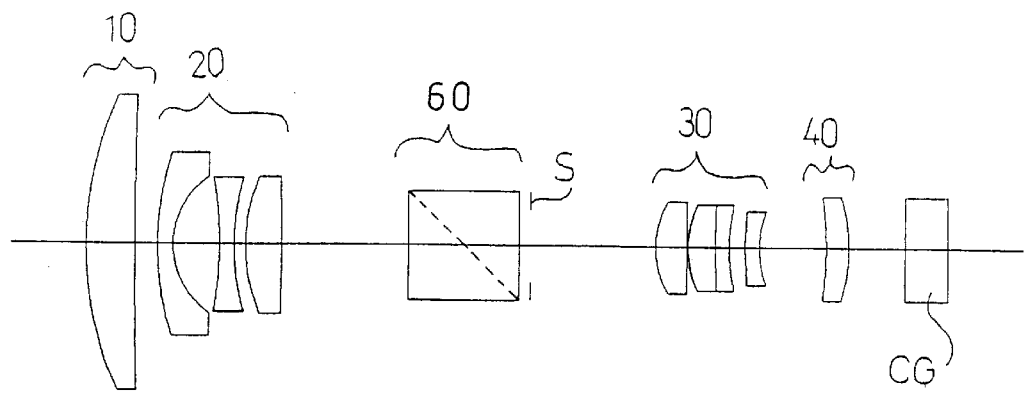
FIG. 37 is a lens arrangement, at the short focal length extremity, of a zoom lens system according to a ninth embodiment, and a deflector (a prism) is shown as a developed view.
Figure 38A:
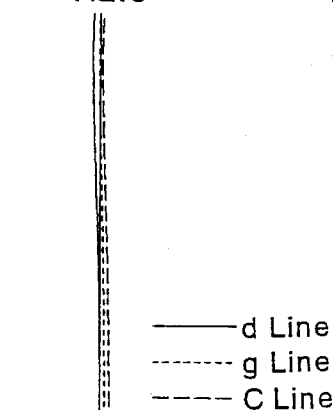
FIGS. 38A, 38D, 38C and 38D are aberration diagrams of the lens arrangement shown in FIG. 37.
Figure 38B:
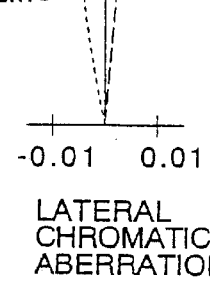
Figure 38C:
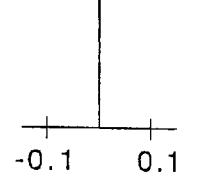
Figure 38D:
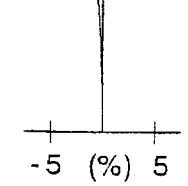
Figure 46:
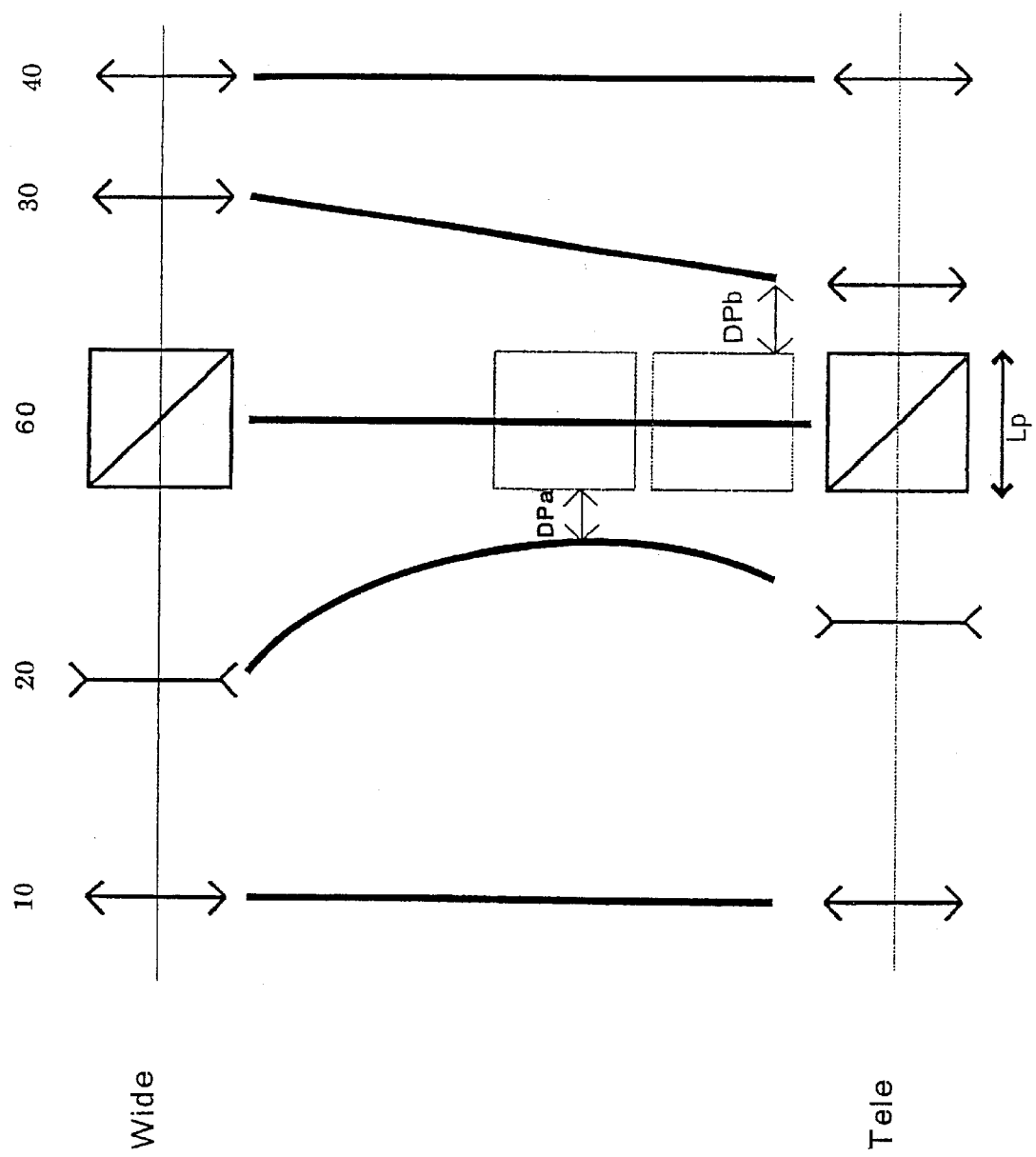
FIG. 46 shows lens-group moving paths of a zoom lens system, with the prism, having a four-leas-group arrangement according to the present invention.

FIG. 37 shows a four-lens-group zoom lens system. The fourth lens group is made immovable upon zooming, has relatively weak power, and is added behind the third lens group of the three-lens-group zoom lens system. Accordingly, telecentriicity which is required when an image pick-up device, such as a CCD, is used is easily attained. FIG. 46 shows the lens-group moving paths of the four-lens-group zoom lens system including the positive first lens group 10, the negative second lens group 20, the prism 60, the positive third lens group 30, and the positive fourth lens group 40, in this order from the object.

Figure 47:
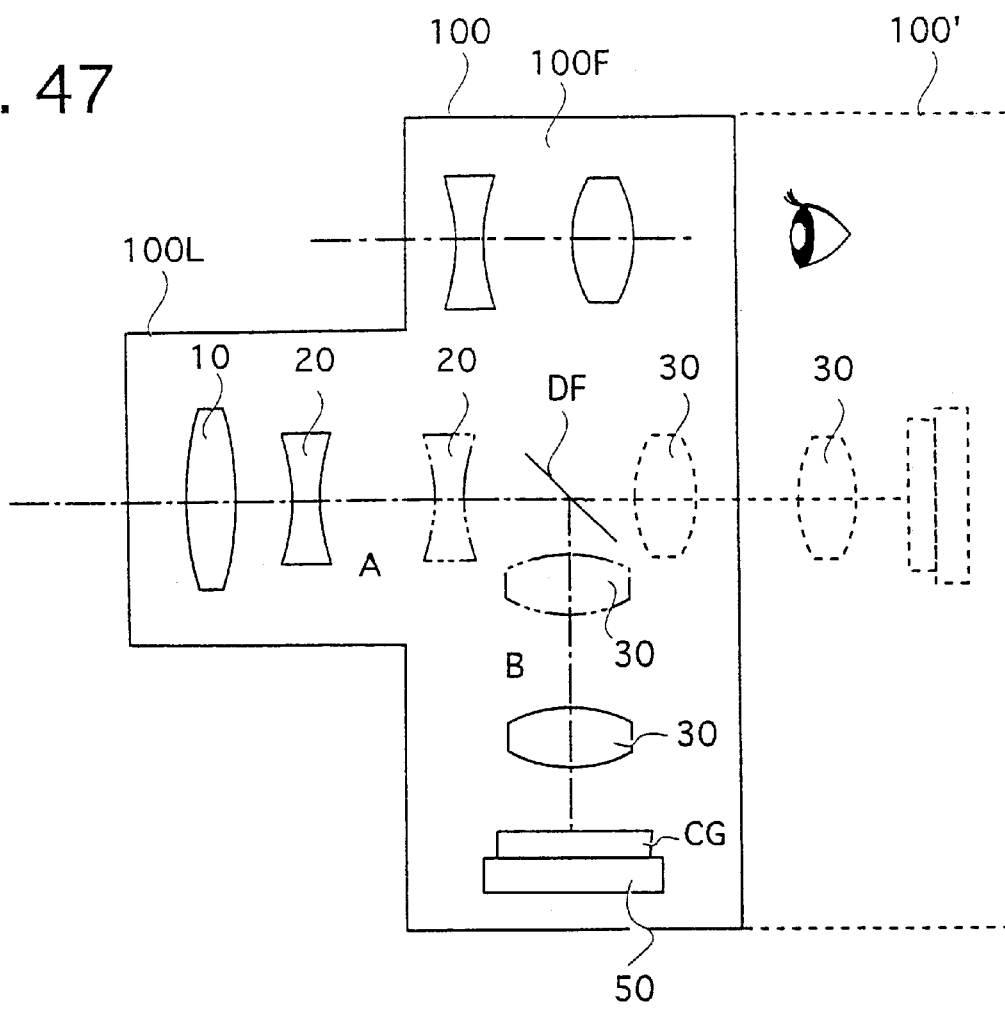
FIG. 47 shows a schematic view of certain elements of the present invention.

In the embodiments, it should be noted that since the optical axis is deflected between lens groups which are made moveable upon zooming, a space necessary for the movement of the lens groups is divided into portions respectively along the thickness of a camera, and an up-and-down direction thereof. Therefore it is advantageous for miniaturization of a camera, in particular, for reducing the thickness thereof. FIG. 47 shows a schematic view of the above-described benefit of such an arrangement. The structure of the photographing lens system is the same as those of FIGS. 1 and 28. A camera body 100 has a lens barrel 100L integrally formed therein. A finder optical system 100F is provided separately from a photographing optical system contained in the lens barrel 100L. It is apparent from the drawing that the camera body 100 with the deflector is much shorter in the thickness than the camera body 100' without deflector. In other words, if the deflector DF is not used, a space, indicated by the arrow B, for moving the third lens group 30, is extended transversely from the second lens group 20.

If a mirror is used, a reflection surface with higher flatness can be obtained at relatively low costs. Furthermore, adjustment on decenteration of the optical system can be performed by the mirror.

In the embodiments, the deflector (the mirror, the prism) deflects the optical axis of the zoom lens system by 90°; however, it is possible to set a value of the deflection angle unless;

(i) a bundle of rays is eclipsed by the deflection surface; and (ii) the second lens group 20 and the third lens group 30 contact each other.

Figure 48:
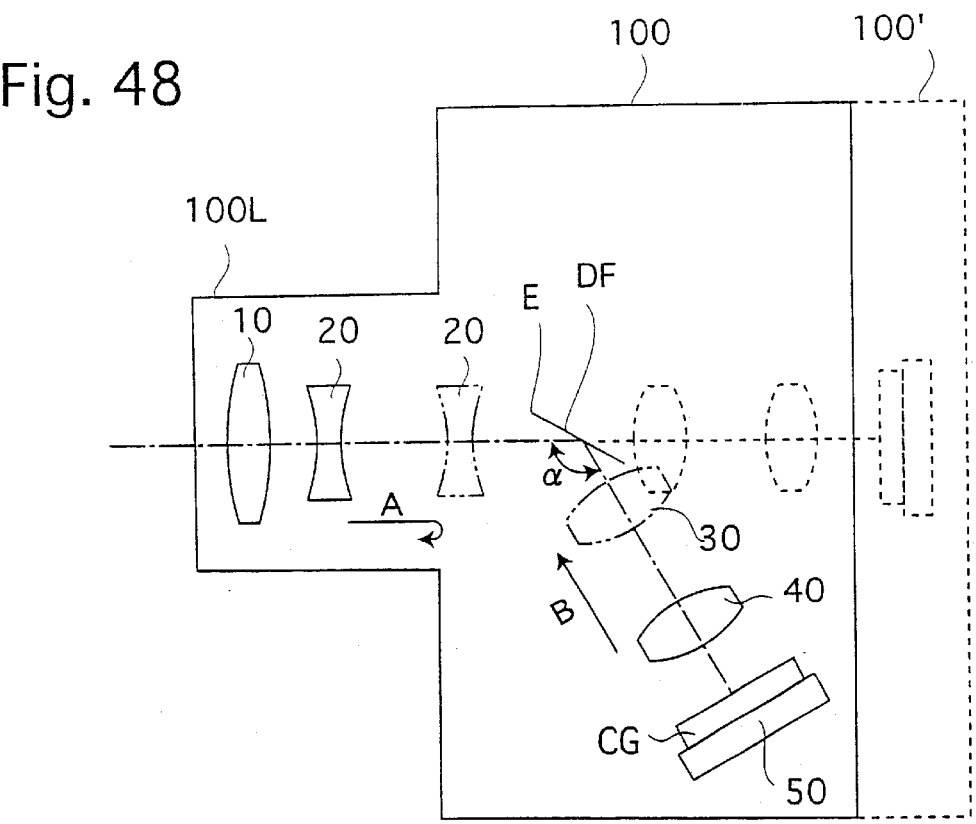
FIG. 48 shows a schematic view of the angle of deflection according to the present invention.

FIG. 48 shows a schematic view with respect to item (i). Any value of the angle $\alpha$ can be set unless a bundle of rays is eclipsed by the deflection surface. If the angle $\alpha$ becomes larger, a part of a bundle of rays may go over an edge E of the deflector, which will cause an eclipse.

Figure 49:
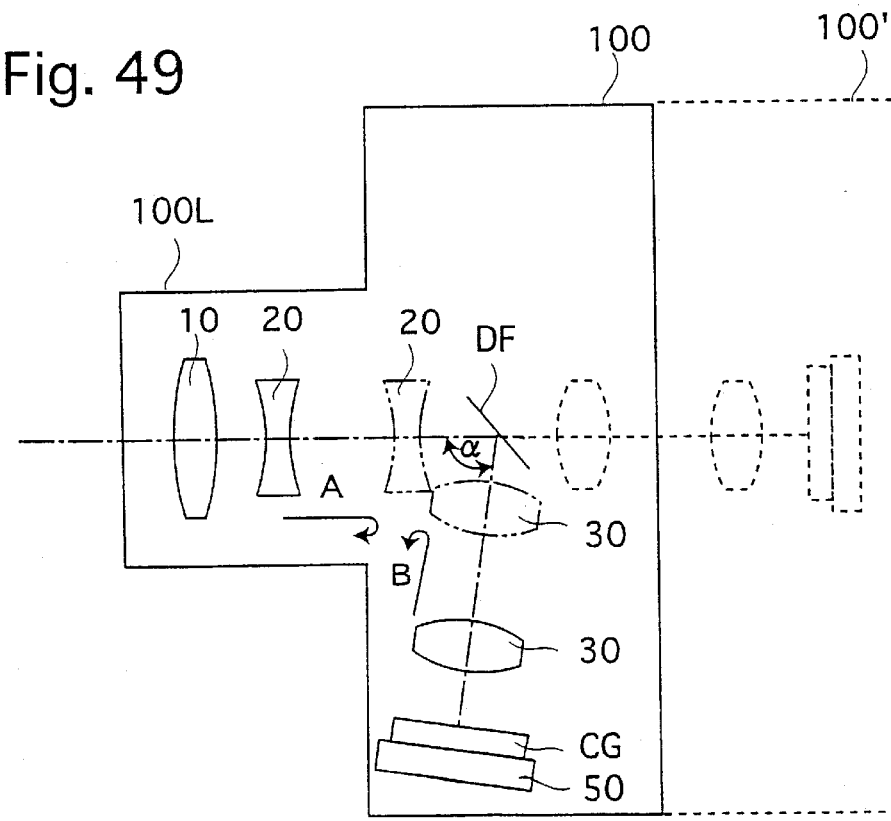
FIG. 49 shows another schematic view of the angle of deflection according to the present invention.

FIG. 49 shows a schematic view with respect to item (ii). If the angle α becomes smaller, as indicated by the second and third lens groups 20, 30 depicted with the dotted lines, there is a possibility that these lens groups come into contact each other.

Condition (1) specifies a magnification-varying operation of the second lens group 20.

If $\log_{10} Z_2/\log_{10} Z$ exceeds the upper limit of condition (1), the magnification-varying operation of the second lens group is largely increased, and thereby the correcting of aberration-fluctuation upon zooming becomes difficult.

If $\log_{10} Z_2/\log_{10} Z$ exceeds the lower limit of condition (1), only the third lens group performs a magnification-varying operation, and thereby the zoom ratio cannot be made larger. Furthermore, the traveling distance of the third lens group becomes too long.

Condition (2) specifies the power of the third lens group.

If $f_w/f_3$ exceeds the upper limit of condition (2), the power of the third lens group becomes too strong, and aberration-fluctuation upon zooming becomes larger, in particular, coma becomes extreme.

If $f_w/f_3$ exceeds the lower limit of condition (2), the power of the third lens group, which is to converge divergent light rays emitted from the second lens group, becomes too weak, and thereby after the optical axis is deflected by the deflector, the optical path length becomes too long.

Condition (2)' specifies the resultant power of the third lens group and the fourth lens group.

If $f_w/f_{(3-4)w}$ exceeds the upper limit of condition (2)', the resultant power becomes too strong, and aberration-fluctuation upon zooming becomes larger, in particular, coma becomes extreme.

If $f_w/f_{(3-4)w}$ exceeds the lower limit of condition (2)', the resultant power of the third lens group and the fourth lens group, which is to converge divergent light rays emitted from the second lens group, becomes too weak, and thereby after the optical axis is deflected by the deflector, the optical path length becomes too long.

Condition (3) specifies the transverse magnification of the third lens group at the long focal length extremity.

If $m_{3t}$ exceeds the upper limit of condition (3), the traveling distance of the second lens group increases, and thereby, the optical path length before the optical axis is deflected by the deflector becomes too long.

If $m_{3t}$ exceeds the lower limit of condition (3), the transverse magnification of the third lens group becomes too large in the negative direction, and thereby a load for correcting aberrations is increased in the third lens group 30, and aberration-fluctuation upon zooming increases.

Condition (4) is for properly positioning the mirror.

If $DM_{min}/f_t$ exceeds the upper limit of condition (4), the space, for positioning the mirror, between the lens groups becomes too large, and thereby the length of the entire lens system increases, and accordingly, the camera cannot be miniaturized.

If $DM_{min}/f_t$ exceeds the lower limit of condition (4), the mirror interferes with the lens group before or behind the mirror.

Condition (5) is for properly positioning the prism.

If $DP_{min}/2y$ exceeds the upper limit of condition (5), the space, for positioning the prism, between the lens groups becomes too large, and thereby the length of the entire lens system increases, and consequently, the camera cannot be miniaturized.

If $DP_{min}/2y$ exceeds the lower limit of condition (5), the prism interferes with the lens group before or behind the prism.

Condition (6) is for properly positioning the prism.

If $DP_{min}/f_t$ exceeds the upper limit of condition (6), the space, for positioning the prism, between the lens groups becomes too large, and thereby the diameter of the frontmost lens element closest to the object (i.e, the most object-side lens element of the first lens group 10) becomes too large in order to secure peripheral illumination at the short focal length extremity.

If $DP_{min}/f_t$ exceeds the lower limit of condition (6), the prism interferes with the lens group before or behind the prism.

Specific embodiments will herein be discussed. Embodiments 1 through 6 (the first group of the embodiments) concern zoom lens systems in which a mirror is employed as a deflector. Embodiments 7 through 10 (the second group of the embodiments) concern zoom lens systems in which a prism is employed as a deflector. In the first group, embodiments 1 and 2 relate to the three-lens-group zoom lens system (FIG. 26), and embodiments 3 through 6 relate to the four-lens-group zoom lens system (FIG. 27). In the second group, embodiments 7 and 8 relate to the three-lens-group zoom lens system in the second aspect (FIG. 45), and embodiments 9 and 10 relate to the four-lens-group zoom lens system (FIG. 46).

Specific numerical data of the embodiments will be described hereinafter. In the diagrams of chromatic aberration (axial chromatic aberration) represented by spherical aberration, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables of the following embodiments, $F_{NO}$ designates the F-number, f designates the focal length of the entire lens system, w designates the half angle-of-view, R designates the radius of curvature of each lens surface, d designates the lens thickness or the distance between the lens elements, $N_d$ designates the refractive index at the d-line, and ν designates the Abbe number. Further, in embodiments 1 through 6, DMa designates the minimum distance from the second lens group (the moveable lens group for zooming immediately before the mirror) to the center of the mirror which is defined as the intersecting point where the optical axis meets the reflection surface of the mirror (refer to FIGS. 26, 27); and DMb designates the minimum distance from the center of the mirror to the third lens group (the moveable lens group for zooming immediately behind the mirror) (refer to FIGS. 26, 27). In embodiments 7 through 10, DPa designates the minimum distance from the second lens group (the moveable lens group for zooming immediately before the prism) to the prism (refer to FIGS. 45, 46); and Deb designates the minimum distance from the prism to the third lens group (the moveable lens group for zooming immediately behind the prism) (refer to FIGS. 45, 46).

In addition to the above, an aspherical surface which is symmetrical with respect to the optical axis is defined as follows:

$$x = Ch^2/\{1+[1-(1+K)C^2h^2]^{1/2}\} + A4h^4 + A6h^6 + A8h^8 + A10h^{10};$$

wherein:

x designates a distance from a tangent plane of an aspherical vertex;

C designates a curvature of the aspherical vertex (1/R);

h designates a distance from the optical axis;

K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient;

Embodiment 1

FIGS. 2 and 4 show the lens arrangement of the first embodiment at the short focal length extremity and the long focal length extremity, respectively. FIGS. 3A through 3D and FIGS. 5A through 5D show the aberration diagrams of FIGS. 2 and 4, respectively. Table 1 shows the numerical data thereof. Surface Nos. 1 and 2 represent the positive first lens group 10, surface Nos. 3 through 8 represent the negative second lens group 20, surface Nos. 9 through 17 represent the positive third lens group 30, and surface Nos. 18 and 19 represent the cover glass CG for the CCD. The first lens group 10 includes a positive single meniscus lens element. The second lens group 20 includes a negative meniscus lens element, a negative lens element, and a positive meniscus lens element, in this order from the object. The third lens group 30 includes a positive lens element, a cemented sub lens group having a positive lens element and a negative lens element, a negative lens element, and a positive lens element, in this order from the object. The mirror M and the diaphragm S are fixed between the second lens group 20 and the third lens group 30. Zooming is performed by moving the second lens group 20 and the third lens group 30 as shown in FIG. 26.

TABLE 1

$F_{NO}$ = 1:2.8–3.0–4.5
f = 8.50–10.50–24.35 (Zoom Ratio: 2.86)
W = 28.5–23.3–10.4
DMa = 6.200
DMb = 6.992

| Surface No. | R | d | Nd | ν |
|---|---|---|---|---|
| 1 | 27.696 | 5.937 | 1.48749 | 70.2 |
| 2 | 167.538 | 2.800–6.401–14.499 | — | — |
| 3 | 18.380 | 1.800 | 1.80400 | 46.6 |
| 4 | 7.732 | 4.964 | — | — |
| 5 | −30.660 | 1.700 | 1.77250 | 49.6 |
| 6 | 48.086 | 0.100 | — | — |
| 7 | 14.769 | 2.353 | 1.84666 | 23.8 |
| 8 | 22.470 | 23.921–20.320–12.222 | — | — |
| Diaphragm | ∞ | 9.922–8.833–0.970 | — | — |
| 9 | 20.617 | 2.448 | 1.74400 | 44.8 |
| 10 | −53.552 | 0.100 | — | — |
| 11 | 12.066 | 3.300 | 1.51633 | 64.1 |
| 12 | −22.254 | 1.800 | 1.84666 | 23.8 |
| 13 | −1697.493 | 5.213 | — | — |
| 14 | −59.214 | 1.600 | 1.80518 | 25.4 |
| 15 | 7.500 | 2.427 | — | — |
| 16* | 11.763 | 2.800 | 1.72151 | 29.2 |
| 17 | −43.306 | 5.025–6.114–13.977 | — | — |
| 18 | ∞ | 3.790 | 1.51633 | 64.1 |
| 19 | ∞ | — | — | — |

*designates the aspherical surface which is rotationally symmetrical with respect to the optical axis.

Aspherical surface data (the aspherical surface coefficients not indicated are zero (0.00))

| Surface No. | K | A4 | A6 | A8 |
|---|---|---|---|---|
| 16 | 0.00 | −0.6054 × 10⁻⁴ | −0.9024 × 10⁻⁶ | 0.2034 × 10⁻⁷ |

Embodiment 2

FIGS. 6 and 8 show the lens arrangement of the second embodiment at the short focal length extremity and the long focal length extremity, respectively. FIGS. 7A through 7D and FIGS. 9A through 9D show the aberration diagrams of FIGS. 6 and 8, respectively. Table 2 shows the numerical data thereof. The basic lens arrangement is the same as the first embodiment except that the negative lens element in the second lens group 20 is replaced with a negative meniscus lens element.

TABLE 2

$F_{NO}$ = 1:2.8–4.7–4.9
f = 8.50–23.10–24.00 (Zoom Ratio: 2.82)
W = 28.7–10.9–10.5
DMa = 6.000
DMb = 6.771

| Surface No. | R | d | Nd | ν |
|---|---|---|---|---|
| 1 | 32.665 | 4.839 | 1.48749 | 70.2 |
| 2 | 970.454 | 1.800–12.386–12.359 | — | — |
| 3* | 23.841 | 1.400 | 1.75700 | 47.8 |
| 4 | 7.468 | 4.317 | — | — |
| 5 | 211.903 | 1.300 | 1.81600 | 46.6 |
| 6 | 22.881 | 0.100 | — | — |
| 7 | 10.596 | 3.000 | 1.84666 | 23.8 |
| 8 | 14.926 | 22.480–11.894–11.921 | — | — |
| Diaphragm | ∞ | 10.092–1.520–0.877 | — | — |
| 9* | 9.846 | 3.011 | 1.58913 | 61.2 |
| 10 | −38.122 | 0.100 | — | — |
| 11 | 20.062 | 3.000 | 1.48749 | 70.2 |
| 12 | −14.152 | 1.200 | 1.84666 | 23.8 |
| 13 | −30.286 | 0.985 | — | — |
| 14 | −131.386 | 1.300 | 1.80100 | 35.0 |
| 15 | 7.489 | 1.515 | — | — |
| 16 | 16.478 | 2.114 | 1.75520 | 27.5 |
| 17 | −137.956 | 10.657–19.228–19.871 | — | — |
| 18 | ∞ | 3.790 | 1.51633 | 64.1 |
| 19 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 3 | 0.00 | −0.4359 × 10⁻⁵ | 0.6936 × 10⁻⁷ | — |
| 9 | 0.00 | −0.1306 × 10⁻³ | −0.1115 × 10⁻⁶ | −0.1907 × 10⁻⁷ |

Embodiment 3

FIGS. 10 and 12 show the lens arrangement of the third embodiment at the short focal length extremity and the long focal length extremity, respectively. FIGS. 11A through 11D and FIGS. 13A through 13D show the aberration diagrams of FIGS. 10 and 12, respectively. Table 3 shows the numerical data thereof. Surface Nos. 1 and 2 represent the positive first lens group 10, surface Nos. 3 through 8 represent the negative second lens group 20, surface Nos. 9 through 15 represent the positive third lens group 30, surface Nos. 16 and 17 represent the positive fourth lens group 40, and surface Nos. 18 and 19 represent the cover glass CG for the CCD. The first lens group 10 includes a positive single meniscus lens element. The second lens group 20 includes a negative meniscus lens element, a negative lens element, and a positive lens element, in this order from the object. The third lens group 30 includes a positive meniscus lens element, a cemented sub lens group having a positive lens element and a negative lens element, and a negative meniscus lens element, in this order from the object. The fourth lens group 40 includes a positive single meniscus lens element. The mirror M and the diaphragm S are fixed between the second lens group 20 and the third lens group 30. Zooming is performed by moving the second lens group 20 and the third lens group 30 as shown in FIG. 27.

TABLE 3

$F_{NO}$ = 1:2.8–4.8–4.8
f = 7.50–20.88–21.20 (Zoom Ratio: 2.83)
W = 33.0–12.5–12.3
DMa = 5.700
DMb = 6.560

| Surface No. | R | d | Nd | ν |
|---|---|---|---|---|
| 1 | 28.275 | 5.388 | 1.48749 | 70.2 |
| 2 | 414.220 | 2.000–12.665–12.660 | — | — |
| 3 | 29.368 | 1.400 | 1.83400 | 37.2 |
| 4 | 7.469 | 4.364 | — | — |
| 5 | −30.929 | 1.300 | 1.80400 | 46.6 |
| 6 | 21.539 | 0.663 | — | — |
| 7 | 15.481 | 3.200 | 1.80518 | 25.4 |
| 8 | −187.627 | 21.973–11.308–11.313 | — | — |
| Diaphragm | ∞ | 9.896–1.209–0.952 | — | — |
| 9 | 9.080 | 2.773 | 1.49700 | 81.6 |
| 10 | 825.601 | 0.100 | — | — |
| 11 | 10.006 | 2.527 | 1.48749 | 70.2 |
| 12 | 229.600 | 1.200 | 1.84666 | 23.8 |
| 13 | 18.788 | 1.893 | — | — |
| 14* | 18.00 | 1.300 | 1.66910 | 55.4 |
| 15 | 10.879 | 6.232–14.919–15.176 | — | — |
| 16 | −40.629 | 2.000 | 1.67270 | 32.1 |
| 17 | −20.908 | 4.999 | — | — |
| 18 | ∞ | 3.790 | 1.51633 | 64.1 |
| 19 | ∞ | — | — | — |

*designates the aspherical surface which is rotationally symmetrical with respect to the optical axis.

Aspherical surface data (the aspherical surface efficients not indicated are zero (0.00)):

| Surface No. | A4 | A6 | A8 |
|---|---|---|---|
| 14 | 0.00 | −0.5924 × $10^{-3}$ | −0.8105 × $10^{-5}$ | −0.1539 × $10^{-6}$ |

Embodiment 4

FIGS. 14 and 16 show the lens arrangemant of the fourth embodiment at the short focal length extremity and the long focal length extremity, respectively. FIGS. 15A through 15D and FIGS. 17A through 17D show the aberration diagrams of FIGS. 14 and 16, respectively. Table 4 shows the numerical data thereof. Surface Nos. 1 and 2 represent the positive first lens group 10, surface Nos. 3 through 8 represent the negative second lens group 20, surface Nos. 9 through 16 represent the positive third lens group 30, surface Nos. 17 and 18 represent the positive fourth lens group 40, and surface Nos. 19 and 20 represent the cover glass CG for the CCD. The first lens group 10 includes a positive single meniscus lens element. The second lens group 20 includes a negative meniscus lens element, a negative lens element, and a positive lens element, in this order from the object. The third lens group 30 includes a positive lens element, a positive meniscus lens element, a negative meniscus lens element, and another negative meniscus lens element, in this order from the object. The fourth lens group 40 includes a positive single lens element. The mirror M and the diaphragm S are fixed between the second lens group 20 and the third lens group 30. Zooming is performed by moving the second lens group 20 and the third lens group 30 as shown in FIG. 27.

TABLE 4

$F_{NO}$ = 1:2.8–4.7–5.2
f = 8.14–20.96–22.99 (Zoom Ratio: 2.82)
W = 30.0–12.1–11.1
DMa = 6.000
DMb = 6.815

| Surface No. | R | d | Nd | ν |
|---|---|---|---|---|
| 1 | 23.984 | 5.444 | 1.48749 | 70.2 |
| 2 | 158.247 | 2.145–11.242–11.046 | — | — |
| 3 | 24.611 | 1.400 | 1.83400 | 37.2 |
| 4 | 7.416 | 4.410 | — | — |
| 5 | −22.119 | 1.300 | 1.69680 | 55.5 |
| 6 | 25.415 | 1.221 | — | — |
| 7 | 18.050 | 2.619 | 1.80518 | 25.4 |
| 8 | −273.620 | 21.025–11.928–12.124 | — | — |
| Diaphragm | ∞ | 10.690–2.614–0.887 | — | — |
| 9* | 14.806 | 2.600 | 1.66910 | 55.4 |
| 10 | −42.910 | 0.100 | — | — |
| 11 | 7.828 | 2.700 | 1.48749 | 70.2 |
| 12 | 47.357 | 0.036 | — | — |
| 13 | 22.821 | 1.200 | 1.84666 | 23.8 |
| 14 | 7.174 | 2.173 | — | — |
| 15* | 11.058 | 2.200 | 1.66910 | 55.4 |
| 16 | 7.547 | 9.737–17.814–19.540 | — | — |
| 17 | 57.793 | 2.200 | 1.80518 | 25.4 |
| 18 | −20.110 | 1.900 | — | — |
| 19 | ∞ | 1.400 | 1.51633 | 64.1 |
| 20 | ∞ | — | — | — |

*designates the aspherical surface which is rotationally symmetrical with respect to the optical axis.

Aspherical surface data (the aspherical surface coefficients not indicated are zero (0.00))

| Surface No. | K | A4 | A6 | A8 |
|---|---|---|---|---|
| 9 | −1.00 | −0.1420 × $10^{-4}$ | 0.7928 × $10^{-8}$ | −0.1696 × $10^{-8}$ |
| 15 | −1.00 | −0.1255 × $10^{-3}$ | −0.4355 × $10^{-5}$ | — |

Embodiment 5

FIGS. 18 and 20 show the lens arrangement of the fifth embodiment at the short focal length extremity and the long focal length extremity, respectively. FIGS. 19A through 19D and FIGS. 21A through 21D show the aberration diagrams of FIG. 18 and 20, respectively. Table 5 shows the numerical data thereof. The basic lens arrangement is the same as the fourth embodiment except that the third lens group 30 includes a positive meniscus lens element, a positive lens element, a negative meniscus lens element, and another negative meniscus lens element, in this order from the object.

TABLE 5

$F_{NO}$ = 1:2.8–4.7–5.1
f = 7.47–19.65–21.11 (Zoom Ratio: 2.83)
W = 33.4–13.2–12.4
DMa = 4.500
DMb = 5.444

| Surface No. | R | d | Nd | ν |
|---|---|---|---|---|
| 1 | 30.104 | 5.471 | 1.48749 | 70.2 |
| 2 | 1165.916 | 2.142–11.850–11.747 | — | — |
| 3 | 28.004 | 1.400 | 1.83400 | 37.2 |
| 4 | 9.984 | 4.036 | — | — |
| 5 | −25.841 | 1.400 | 1.80400 | 46.6 |
| 6 | 14.427 | 2.198 | — | — |
| 7 | 19.321 | 2.601 | 1.80518 | 25.4 |
| 8 | −131.192 | 18.688–8.981–9.084 | — | — |

TABLE 5-continued $F_{NO}$ = 1:2.8–4.7–5.1
f = 7.47–19.65–21.11 (Zoom Ratio: 2.83)
W = 33.4–13.2–12.4
DMa = 4.500
DMb = 5.444

| Surface No. | R | d | Nd | ν |
|---|---|---|---|---|
| Diaphragm | ∞ | 10.541–2.223–0.963 | — | — |
| 9* | 11.897 | 2.800 | 1.66910 | 55.4 |
| 10 | 483.240 | 0.100 | — | — |
| 11 | 9.679 | 2.900 | 1.48749 | 70.2 |
| 12 | −63.430 | 0.100 | — | — |
| 13 | 27.029 | 1.300 | 1.80518 | 25.4 |
| 14 | 6.763 | 2.577 | — | — |
| 15* | 15.397 | 2.300 | 1.66910 | 55.4 |
| 16 | 18.175 | 7.109–15.427–16.687 | — | — |
| 17 | 73.642 | 2.200 | 1.75000 | 27.6 |
| 18 | −43.715 | 3.674 | — | — |
| 19 | ∞ | 1.400 | 1.51633 | 64.1 |
| 20 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 9 | −1.00 | −0.1524 × 10⁻⁴ | −0.3662 × 10⁻⁶ | — |
| 15 | 1.00 | −0.1465 × 10⁻³ | −0.2765 × 10⁻⁵ | — |

Embodiment 6

Figure 22:
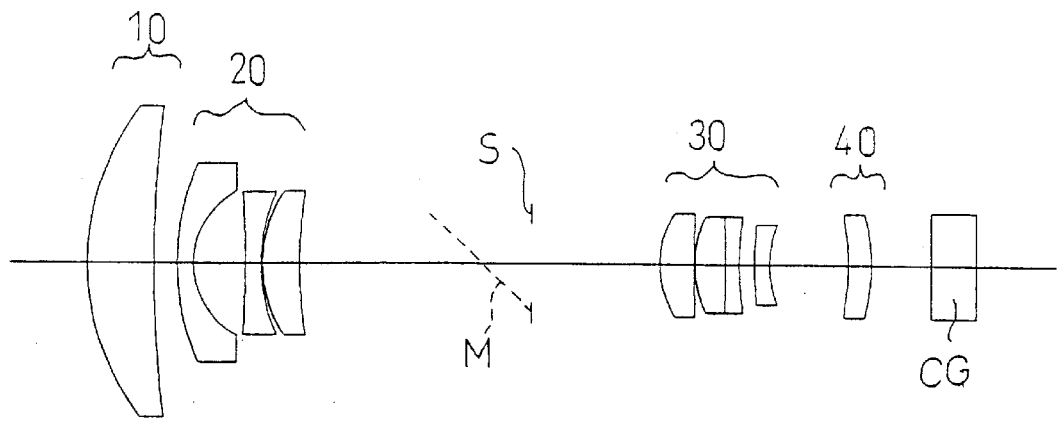
FIG. 22 is a lens arrangement, at the short focal length extremity, of a zoom lens system according to a sixth embodiment, and a deflector (a mirror) is shown as a developed view.
Figure 23A:
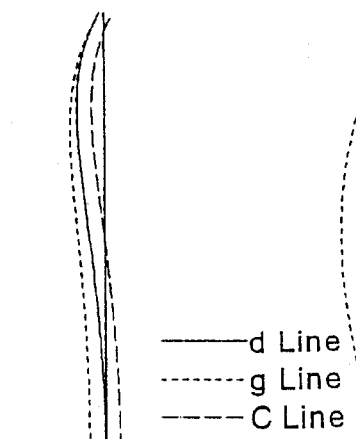
FIGS. 23A, 23B, 23C and 23D are aberration diagrams of the lens arrangement shown in FIG. 22.
Figure 23B:
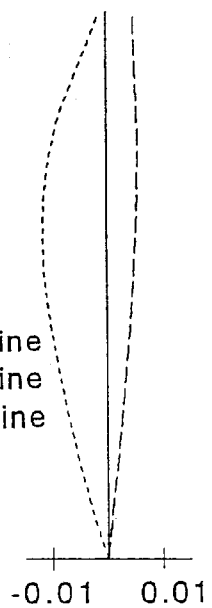
Figure 23C:
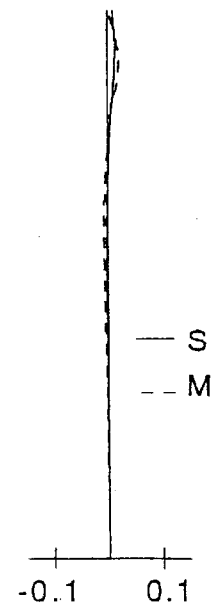
Figure 23D:
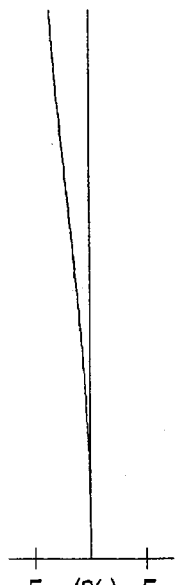

FIGS. 22 and 24 show the lens arrangement of the sixth embodiment at the short focal length extremity and the long focal length extremity, respectively. FIGS. 23A through 23D and FIGS. 25A through 25D show the aberration diagrams of FIGS. 22 and 24, respectively. Table 6 shows the numerical data thereof. The basic lens arrangement is the same as the third embodiment except that the positive lens element in the second lens group 20 is replaced with a positive meniscus lens element.

TABLE 6

$F_{NO}$ = 1:2.8–4.5–5.4
f = 8.42–20.60–23.80 (Zoom Ratio: 2.83)
W = 29.0–12.2–10.7
DMa = 5.900
DMb = 6.561

| Surface No. | R | d | Nd | ν |
|---|---|---|---|---|
| 1 | 22.136 | 5.696 | 1.48749 | 70.2 |
| 2 | 110.594 | 2.000–9.868–9.375 | — | — |
| 3 | 21.500 | 1.400 | 1.83400 | 37.2 |
| 4 | 7.105 | 4.474 | — | — |
| 5 | −90.229 | 1.300 | 1.77250 | 49.6 |
| 6 | 14.565 | 0.144 | — | — |
| 7 | 11.145 | 3.200 | 1.80518 | 25.4 |
| 8 | 38.776 | 19.637–11.769–12.262 | — | — |
| Diaphragm | ∞ | 11.043–3.483–0.692 | — | — |
| 9 | 8.246 | 2.930 | 1.49700 | 81.6 |
| 10 | 88.917 | 0.100 | — | — |
| 11 | 9.951 | 2.634 | 1.48749 | 70.2 |
| 12 | −229.365 | 1.200 | 1.84666 | 23.8 |
| 13 | 27.591 | 1.310 | — | — |
| 14* | 22.139 | 1.300 | 1.66910 | 55.4 |
| 15 | 10.080 | 6.693–14.253–17.043 | — | — |
| 16 | −24.082 | 2.000 | 1.67270 | 32.1 |
| 17 | −16.400 | 5.000 | — | — |

TABLE 6-continued $F_{NO}$ = 1:2.8–4.5–5.4
f = 8.42–20.60–23.80 (Zoom Ratio: 2.83)
W = 29.0–12.2–10.7
DMa = 5.900
DMb = 6.561

| Surface No. | R | d | Nd | ν |
|---|---|---|---|---|
| 18 | ∞ | 3.790 | 1.51633 | 64.1 |
| 19 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 14 | 0.00 | −0.7326 × 10⁻³ | −0.7913 × 10⁻⁶ | −0.3993 × 10⁻⁶ |

Embodiment 7

FIGS. 29 and 31 show the lens arrangement of the seventh embodiment at the short focal length eremity and the long focal length extremity, respectively. FIGS. 30A through 30D and FIGS. 32A through 32D show the aberration diagrams of FIGS. 29 and 31, respectively. Table 7 shows the numerical data thereof. Surface Nos 1 and 2 represent the positive first lens group 10, surface Nos. 3 through 8 represent the negative second lens group 20, surface Nos. 9 and 10 represent the prism 60, surface Nos 11 through 19 represent the positive third lens group 30, and surface Nos. 20 and 21 represent the cover glass CG for the CCD. The first lens group 10 includes a positive single meniscus lens element. The second lens group 20 includes a negative meniscus lens element, a negative lens element, and a positive meniscus lens element, in this order from the object. The third lens group 30 includes a positive lens element, a cemented sub lens group having a positive lens element and a negative lens element, a negative meniscus lens element, and a positive lens element, in this order from the object. The prism 60 and the diaphragm S are fixed between the second lens group 20 and the third lens group 30. Zooming is performed by moving the second lens group 20 and the third lens group 30 as shown in FIG. 45.

TABLE 7

$F_{NO}$ = 1:2.8–3.4–4.6
f = 8.35–14.50–23.60 (Zoom Ratio: 2.83)
W = 30.3–17.8–11.1
DMa = 1.508
DMb = 1.971

| Surface No. | R | d | Nd | ν |
|---|---|---|---|---|
| 1 | 25.193 | 5.022 | 1.48749 | 70.2 |
| 2 | 198.129 | 2.000–9.631–12.724 | — | — |
| 3 | 27.829 | 1.400 | 1.83400 | 37.2 |
| 4 | 7.414 | 4.134 | — | — |
| 5 | −43.539 | 1.300 | 1.78800 | 47.4 |
| 6 | 16.760 | 0.370 | — | — |
| 7 | 13.247 | 3.200 | 1.80518 | 25.4 |
| 8 | 365.546 | 12.232–4.601–1.508 | — | — |
| 9 | ∞ | 10.000 | 1.51633 | 64.1 |
| 10 | ∞ | 1.000 | — | — |
| Diaphragm | ∞ | 9.531–6.284–0.971 | — | — |
| 11 | 9.457 | 2.973 | 1.48749 | 70.2 |
| 12 | −65.344 | 0.102 | — | — |

TABLE 7-continued $F_{NO}$ = 1:2.8–3.4–4.6
f = 8.35–14.50–23.60 (Zoom Ratio: 2.83)
W = 30.3–17.8–11.1
DMa = 1.508
DMb = 1.971

| Surface No. | R | d | Nd | ν |
|---|---|---|---|---|
| 13 | 9.746 | 2.661 | 1.48749 | 70.2 |
| 14 | −811.908 | 1.200 | 1.84666 | 23.8 |
| 15 | 17.006 | 1.464 | — | — |
| 16* | 25.000 | 1.300 | 1.66910 | 55.4 |
| 17 | 12.326 | 7.321 | — | — |
| 18 | 54.145 | 2.000 | 1.80518 | 25.4 |
| 19 | −323.292 | 4.999–8.246–13.558 | — | — |
| 20 | ∞ | 3.790 | 1.51633 | 64.1 |
| 21 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 16 | 0.00 | −0.5272 × 10$^{−3}$ | −0.6482 × 10$^{−6}$ | 0.1058 × 10$^{−6}$ |

Embodiment 8

Figure 35:
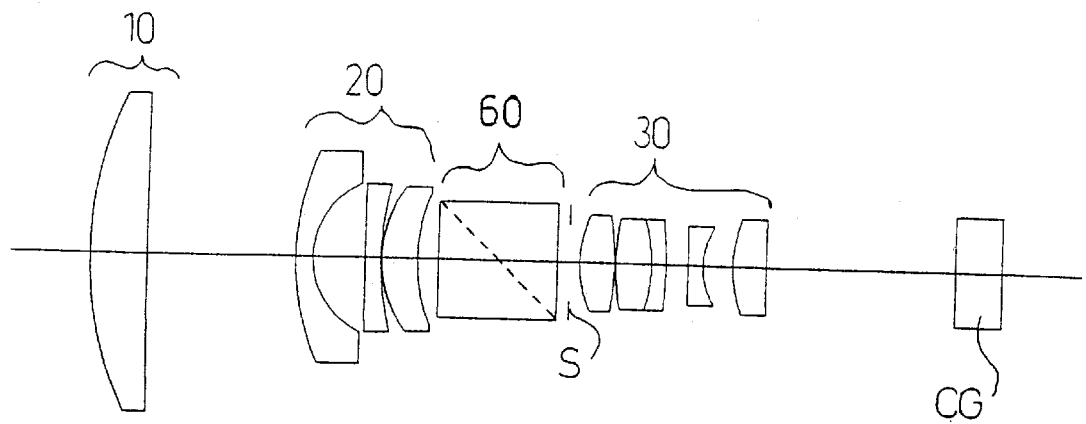
FIG. 35 is the lens arrangement, at the long focal length extremity, of the zoom lens system according to the eighth embodiment.
Figure 36A:
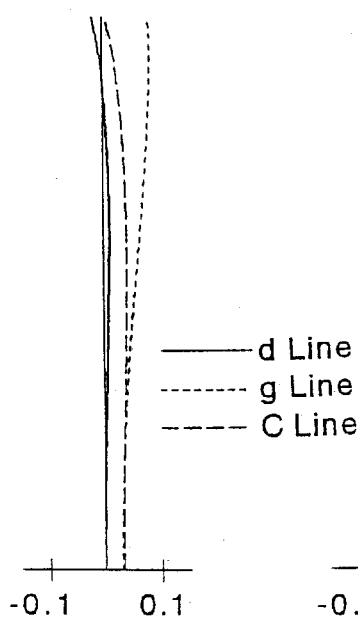
FIGS. 36A, 36B, 36C and 36D are aberration diagrams of the lens arrangement shown in FIG. 35.
Figure 36B:
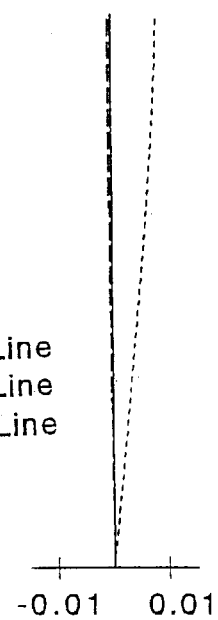
Figure 36C:
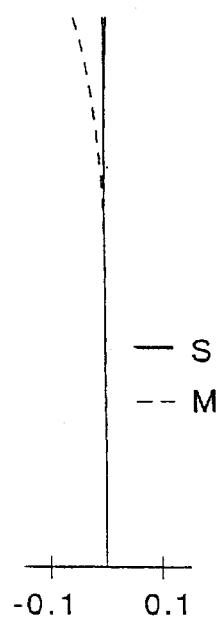
Figure 36D:
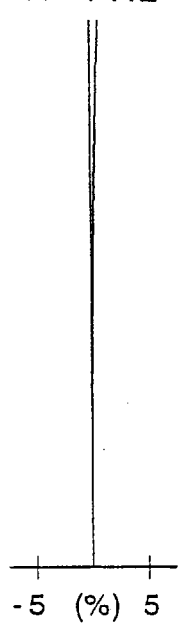

FIGS. 33 and 35 show the lens arrangement of the eighth embodiment at the short focal length extremity and the long focal length extremity, respectively. FIGS. 34A through 34D and FIGS. 36A through 36D show the aberration diagrams of FIGS. 33 and 35, respectively. Table 8 shows the numerical data thereof. The basic lens arrangement is the same as the seventh embodiment except that the negative lens element in the second lens group 20 is replaced with a negative meniscus lens element, and the most image-side positive lens element in the third lens group 30 is replaced with a positive meniscus lens element.

TABLE 8

$F_{NO}$ = 1:2.8–4.7–4.8
f = 8.27–22.90–23.60 (Zoom Ratio: 2.85)
W = 30.3–11.5–11.2
DMa = 1.708
DMb = 1.827

| Surface No. | R | d | Nd | ν |
|---|---|---|---|---|
| 1 | 32.204 | 4.780 | 1.48749 | 70.2 |
| 2 | 769.066 | 1.800–12.336–12.319 | — | — |
| 3* | 23.217 | 1.400 | 1.75700 | 47.8 |
| 4 | 7.114 | 4.402 | — | — |
| 5 | 421.841 | 1.300 | 1.81600 | 46.6 |
| 6 | 23.859 | 0.100 | — | — |
| 7 | 10.505 | 3.000 | 1.84666 | 23.8 |
| 8 | 15.674 | 12.243–1.708–1.724 | — | — |
| 9 | ∞ | 10.000 | 1.51633 | 64.1 |
| 10 | ∞ | 1.000 | — | — |
| Diaphragm | ∞ | 9.553–1.302–0.827 | — | — |
| 11 | 9.664 | 2.891 | 1.58913 | 61.2 |
| 12 | −29.254 | 0.172 | — | — |
| 13 | 22.388 | 3.000 | 1.48749 | 70.2 |
| 14 | −13.085 | 1.200 | 1.84666 | 23.8 |
| 15 | −37.177 | 1.805 | — | — |
| 16 | 145.320 | 1.300 | 1.80100 | 35.0 |
| 17 | 6.679 | 2.455 | — | — |
| 18 | 12.031 | 2.753 | 1.75520 | 27.5 |
| 19 | 126.242 | 7.055–15.307–15.782 | — | — |

TABLE 8-continued $F_{NO}$ = 1:2.8–4.7–4.8
f = 8.27–22.90–23.60 (Zoom Ratio: 2.85)
W = 30.3–11.5–11.2
DMa = 1.708
DMb = 1.827

| Surface No. | R | d | Nd | ν |
|---|---|---|---|---|
| 20 | ∞ | 3.790 | 1.51633 | 64.1 |
| 21 | ∞ | — | — | — |

*designates the aspherical surface which is rotationally symmetrical with respect to the optical axis.

Aspherical surface data (the aspherical surface coefficients not indicated are zero (0.00))

| Surface No. | K | A4 | A6 | A8 |
|---|---|---|---|---|
| 3 | 0.00 | −0.8493 × 10$^{−5}$ | 0.1967 × 10$^{−6}$ | 0.6970 × 10$^{−10}$ |
| 11 | 0.00 | −0.1500 × 10$^{−3}$ | −0.6453 × 10$^{−6}$ | −0.5360 × 10$^{−8}$ |

Embodiment 9

FIGS. 37 and 39 show the lens arrangement of the ninth embodiment at the short focal length extremity and the long focal length extremity, respectively. FIGS. 38A through 38D and FIGS. 40A through 40D show the aberration diagrams of FIGS. 37 and 39, respectively. Table 9 shows the numerical data thereof. Surface Nos 1 and 2 represent the positive first lens group 10, surface Nos. 3 through 8 represent the negative second lens group 20, surface Nos. 9 and 10 represent the prism 60, surface Nos. 11 through 17 represent the positive third lens group 30, surface Nos. 18 and 19 represent the positive fourth lens group 40, and surface Nos. 20 and 21 represent the cover glass CG for the CCD. The first lens group 10 includes a positive single meniscus lens element. The second lens group 20 includes a negative meniscus lens element, a negative lens element, and a positive lens element, in this order from the object. The third lens group 30 includes a positive lens element, a cemented sub lens group having a positive lens element and a negative lens element, and a negative meniscus lens element, in this order from the object. The fourth lens group 40 includes a positive single meniscus lens element. The prism 60 and the diaphragm S are fixed between the second lens group 20 and the third lens group 30. Zooming is performed by moving the second lens group 20 and the third lens group 30 as shown in FIG. 46.

TABLE 9

$F_{NO}$ = 1:2.8–4.7–5.2
f = 7.50–19.20–21.20 (Zoom Ratio: 2.83)
W = 33.0–13.6–12.4
DMa = 1.307
DMb = 1.992

| Surface No. | R | d | Nd | ν |
|---|---|---|---|---|
| 1 | 33.363 | 4.319 | 1.48749 | 70.2 |
| 2 | 617.255 | 2.000–11.956–11.763 | — | — |
| 3 | 27.003 | 1.400 | 1.83400 | 37.2 |
| 4 | 7.588 | 4.178 | — | — |
| 5 | −35.577 | 1.300 | 1.80400 | 46.6 |
| 6 | 22.093 | 1.020 | — | — |
| 7 | 15.786 | 3.200 | 1.80518 | 25.4 |
| 8 | −661.726 | 11.263–1.307–1.500 | — | — |
| 9 | ∞ | 10.000 | 1.51633 | 64.1 |

TABLE 9-continued $F_{NO} = 1:2.8–4.7–5.2$
$f = 7.50–19.20–21.20$ (Zoom Ratio: 2.83)
$W = 33.0–13.6–12.4$
$DMa = 1.307$
$DMb = 1.992$

| Surface No. | R | d | Nd | ν |
|---|---|---|---|---|
| 10 | ∞ | 1.000 | — | — |
| Diagragm | ∞ | 11.274–2.774–0.992 | — | — |
| 11 | 8.546 | 2.822 | 1.49700 | 81.6 |
| 12 | –291.107 | 0.100 | — | — |
| 13 | 9.640 | 2.450 | 1.48749 | 70.2 |
| 14 | 101.558 | 1.200 | 1.84666 | 23.8 |
| 15 | 16.271 | 1.422 | — | — |
| 16* | 21.061 | 1.300 | 1.66910 | 55.4 |
| 17 | 10.656 | 5.962–14.462–16.244 | — | — |
| 18 | –32.322 | 2.000 | 1.67270 | 32.1 |
| 19 | –16.899 | 4.999 | — | — |
| 20 | ∞ | 3.790 | 1.51633 | 64.1 |
| 21 | ∞ | — | — | — |

*designates the aspherical surface which is rotationally symmetrical with respect to the optical axis.

Aspherical surface data (the aspherical surface coefficients not indicated are zero (0.00)):

| Surface No | K | A4 | A6 | A8 |
|---|---|---|---|---|
| 16 | 0.00 | $-0.7200 \times 10^{-3}$ | $-0.1017 \times 10^{-4}$ | $-0.2324 \times 10^{-6}$ |

Embodiment 10

Figures 43, 44A, 44B, 44C, 44D:
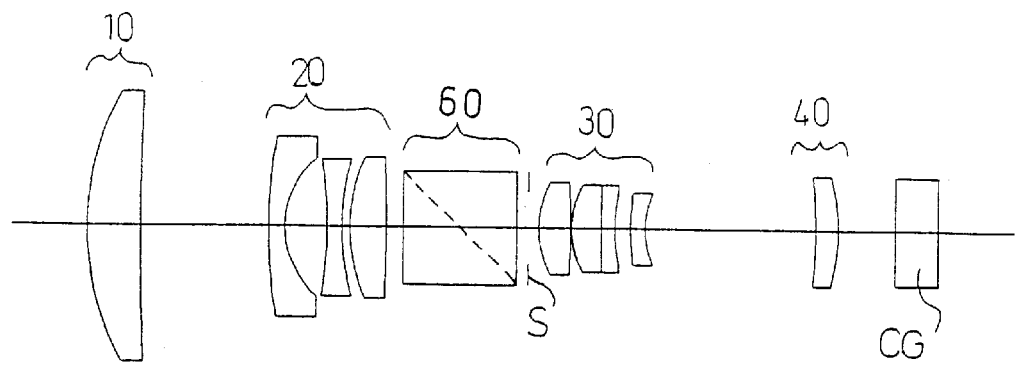
FIG. 43 is the lens arrangement, at the long focal length extremity, of the zoom lens system according to the tenth embodiment.
FIGS. 44A, 44B, 44C and 44D are aberration diagrams of the lens arrangement shown in FIG. 43.

FIGS. 41 and 43 show the lens arrangement of the tenth embodiment at the short focal length extremity and the long focal length extremity, respectively. FIGS. 42A through 42D and FIGS. 44A through 44D show the aberration diagrams the of FIGS. 41 and 43, respectively. Table 10 shows the numerical data thereof. The basic lens arrangement is the same as the ninth embodiment.

TABLE 10

$F_{NO} = 1:2.8–4.6–5.1$
$f = 8.20–21.25–23.20$ (Zoom Ratio: 2.83)
$W = 30.7–12.3–11.3$
$DMa = 1.346$
$DMb = 1.943$

| Surface No. | R | d | Nd | ν |
|---|---|---|---|---|
| 1 | 25.767 | 4.702 | 1.48749 | 70.2 |
| 2 | 291.119 | 2.145–11.429–11.249 | — | — |
| 3 | 45.594 | 1.400 | 1.83400 | 37.2 |
| 4 | 7.880 | 3.737 | — | — |
| 5 | –40.221 | 1.300 | 1.80400 | 46.6 |
| 6 | 21.809 | 0.701 | — | — |
| 7 | 15.136 | 3.200 | 1.80518 | 25.4 |
| 8 | –159.484 | 10.630–1.346–1.526 | — | — |
| 9 | ∞ | 10.000 | 1.51633 | 64.1 |
| 10 | ∞ | 1.000 | — | — |
| Diaphragm | ∞ | 10.622–2.553–0.943 | — | — |
| 11 | 9.145 | 2.779 | 1.49700 | 81.6 |
| 12 | –73.091 | 0.100 | — | — |
| 13 | 8.614 | 2.611 | 1.48749 | 70.2 |
| 14 | 930.807 | 1.200 | 1.84666 | 23.8 |
| 15 | 17.387 | 1.369 | — | — |
| 16* | 20.141 | 1.300 | 1.66910 | 55.4 |
| 17 | 7.982 | 5.415–13.484–15.094 | — | — |
| 18 | –42.809 | 2.000 | 1.78470 | 26.3 |
| 19 | –17.730 | 5.000 | — | — |

TABLE 10-continued $F_{NO} = 1:2.8–4.6–5.1$
$f = 8.20–21.25–23.20$ (Zoom Ratio: 2.83)
$W = 30.7–12.3–11.3$
$DMa = 1.346$
$DMb = 1.943$

| Surface No. | R | d | Nd | ν |
|---|---|---|---|---|
| 20 | ∞ | 3.790 | 1.51633 | 64.1 |
| 21 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 16 | 0.00 | $-0.7078 \times 10^{-3}$ | $-0.9649 \times 10^{-5}$ | $-0.6666 \times 10^{-7}$ |

Table 11 shows each condition for each embodiment.

TABLE 11

| | Embodiment 1 | Embodiment 2 | Embodiment 3 |
|---|---|---|---|
| Cond. (1) | 0.293 | 0.235 | 0.271 |
| Cond. (2) | 0.491 | 0.525 | — |
| Cond. (2)' | — | — | 0.445 |
| Cond. (3) | –0.984 | –1.040 | –1.016 |
| Cond. (4) | 0.542 | 0.532 | 0.578 |

| | Embodiment 4 | Embodiment 5 | Embodiment 6 |
|---|---|---|---|
| Cond. (1) | 0.261 | 0.239 | 0.221 |
| Cond. (2)' | 0.368 | 0.434 | 0.509 |
| Cond. (3) | –1.103 | –1.077 | –1.175 |
| Cond. (4) | 0.558 | 0.471 | 0.524 |

| | Embod. 7 | Embod. 8 | Embod. 9 | Embod. 10 |
|---|---|---|---|---|
| Cond. (1) | 0.301 | 0.232 | 0.197 | 0.255 |
| Cond. (2) | 0.499 | 0.540 | — | — |
| Cond. (2)' | — | — | 0.453 | 0.500 |
| Cond. (3) | –0.992 | –1.031 | –1.109 | –1.098 |
| Cond. (5) | 1.033 | 1.047 | 1.016 | 1.015 |
| Cond. (6) | 0.427 | 0.429 | 0.467 | 0.426 |

As can be understood from the above, each condition of each embodiment is satisfied. Furthermore, aberrations are also relatively well corrected.

According to the above description, the thickness of a camera which is used with a zoom lens system can be reduced.

What is claimed is:

1. A zoom lens system comprising a plurality of lens groups, wherein a deflector, which deflects an optical axis of said zoom lens system, is positioned between first and second lens groups which are movable for zooming, said zoom lens system comprising a lens positioned at an image side of said second movable lens group, wherein said zoom lens system satisfies the following conditions:

$0 < \log_{10} Z_2 / \log_{10} Z < 0.4$ $0.2 < f_w / f_{(3-4)w} < 0.6$ $-1.3 < m_{3t} < -0.8$ wherein $Z_2 = m_{2t}/m_{2w}$;

$Z = f_t/f_w$;

$m_{2t}$ designates the transverse magnification of said second lens group at the long focal length extremity;

$m_{2w}$ designates the transverse magnification of said second lens group at the short focal length extremity;

$f_t$ designates the focal length of the entire lens system at the long focal length extremity;

$f_w$ designates the focal length of the entire lens system at the short focal length extremity;

$f_{(3-4)w}$ designates the resultant focal length of said second movable lens group and the lens positioned at an image side of said second movable lens group at the short focal length extremity; and $m_{3t}$ designates the transverse magnification of said third lens group at the long focal length extremity.

2. The zoom lens according to claims 1 wherein said deflector is a mirror.

3. The zoom lens according to claim 1 wherein said deflector is a prism.

4. A zoom lens system comprising a plurality of lens groups, wherein a deflector which deflects an optical axis of said zoom lens system is positioned between lens groups which are movable for zooming, said movable lens groups comprising first and second movable lens groups having optical axes which intersect at substantially a right angle, said zoom lens system consisting of three lens groups, wherein said zoom lens system satisfies the following conditions:

$0 < \log_{10} Z_2 / \log_{10} Z < 0.4$ $0.2 < f_w/f_3 < 0.6$ $-1.3 < m_{3t} < -0.8$ wherein $Z_2 = m_{2t}/m_{2w}$;

$Z = f_t/f_w$;

$m_{2t}$ designates the transverse magnification of said second lens group at the long focal length extremity;

$m_{2w}$ designates the transverse magnification of said second lens group at the short focal length extremity;

$f_t$ designates the focal length of the entire lens system at the long focal length extremity;

$f_w$ designates the focal length of the entire lens system at the short focal length extremity;

$f_3$ designates the focal length of the third lens group; and $m_{3t}$ designates the transverse magnification of said third lens group at the long focal length extremity.

5. The zoom lens according to claim 4, wherein said deflector is a mirror.

6. The zoom lens according to claim 4, wherein said deflector is a prism.

7. A zoom lens system comprising a plurality of lens groups and a deflector, wherein said plurality of lens groups comprises a positive first lens group, a negative second lens group, and a positive third lens group, in this order from an object;

wherein said zoom lens system performs zooming by moving said second lens group and said third lens group along the optical axis of said zoom lens system, optical axes of said second and third lens groups intersecting, no lens group being positioned between said second and third lens groups and said deflector; and wherein said deflector is positioned between said second lens group and said third lens group.

8. The zoom lens system according to claim 7, further comprising a positive fourth lens group provided on an image side of said positive third lens group.

9. The zoom lens according to claim 7, wherein said zoom lens system satisfies the following conditions:

$0 < \log_{10} Z_2 / \log_{10} Z < 0.4$ $0.2 < f_w/f_3 < 0.6$ $-1.3 < m_{3t} < -0.8$ wherein $Z_2 = m_{2t}/m_{2w}$;

$Z = f_t/f_w$;

$m_{2t}$ designates the transverse magnification of said second lens group at the long focal length extremity;

$m_{2w}$ designates the transverse magnification of said second lens group at the short focal length extremity;

$f_t$ designates the focal length of the entire lens system at the long focal length extremity;

$f_w$ designates the focal length of the entire lens system at the short focal length extremity;

$f_3$ designates the focal length of the third lens group; and $m_{3t}$ designates the transverse magnification of said third lens group at the long focal length extremity.

10. The zoom lens system according to claim 8, wherein said zoom lens system satisfies the following conditions:

$0 < \log_{10} Z_2 / \log_{10} Z < 0.4$ $0.2 < f_w/f_{(3-4)w} < 0.6$ $-1.3 < m_{3t} < -0.8$ wherein $Z_2 = m_{2t}/m_{2w}$;

$z = f_t/f_w$;

$m_{2t}$ designates the transverse magnification of said second lens group at the long focal length extremity;

$m_{2w}$ designates the transverse magnification of said second lens group at the short focal length extremity;

$f_t$ designates the focal length of the entire lens system at the long focal length extremity;

$f_w$ designates the focal length of the entire lens system at the short focal length extremity;

$f_{(3-4)w}$ designates the resultant focal length of said third lens group and said fourth lens group at short focal length extremity; and $m_{3t}$ designates the transverse magnification of said third lens group at the long focal length extremity.

11. The zoom lens system according to claim 7, wherein said deflector is a mirror.

12. The zoom lens system according to claim 11, wherein said zoom lens system satisfies the following condition:

$0.25 < DM_{min}/f_t < 0.8$ wherein

DM$_{min}$=DMa+DMb;

DMa designates the minimum distance from the lens group immediately before said mirror to the center of said mirror which is defined as the intersecting point where the optical axis meets the reflection surface of said mirror;

DMb designates the minimum distance from the center of said mirror to the lens group immediately behind said mirror; and f$_t$ designates the focal length of the entire lens system at the long focal length extremity.

13. The zoom lens system according to claim 7, wherein said deflector is a prism.

14. The zoom lens system according to claim 13, wherein said zoom lens system satisfies the following condition:

$$0.8<DP_{min}/2y<1.5$$

wherein

DP$_{min}$=DPA+(Lp/Np)+DPb;

DPa designates the minimum distance from the lens group immediately before said prism to said prism;

Lp designates the axial thickness of said prism along the optical axis;

Np designates the refractive index of said prism;

DPb designates the minimum distance from said prism to the lens group immediately behind said prism; and 2y designates the image size determined by the optical system according to the relationship y=f x tan W, where f represents the focal length of the entire lens system and W represents the half angle-of-view.

15. The zoom lens system according to claim 14, wherein said zoom lens system satisfies the following condition:

$$0.25<DP_{min}/f_t<0.8$$

wherein f$_t$ designates the focal length of the entire lens system at the long focal length extremity.

16. The zoom lens system according to claim 8, wherein said deflector is a mirror.

17. The zoom lens system according to claim 16, wherein said zoom lens system satisfies the following condition:

$$0.25<DM_{min}/f_t<0.8$$

wherein

DM$_{min}$=DMa+DMb;

DMa designates the minimum distance from the lens group immediately before said mirror to the center of said mirror which is defined as the intersecting point where the optical axis meets the reflection surface of said mirror;

DMb designates the minimum distance from the center of said mirror to the lens group immediately behind said mirror; and f$_t$ designates the focal length of the entire lens system at the long focal length extremity.

18. The zoom lens system according to claim 8, wherein said deflector is a prism.

19. The zoom lens system according to claim 18, wherein said zoom lens system satisfies the following condition:

$$0.8<DP_{min}/2y<1.5$$

wherein

DP$_{min}$=DPa+(Lp/Np)+DBb;

DPa designates the minimum distance from the lens group immediately before said prism to said prism;

Lp designates the axial thickness of said prism along the optical axis;

Np designates the refractive index of said prism;

DPb designates the minimum distance from said prism to the lens group immediately behind said prism; and 2y designates the image size determined by the optical system, according to the relationship y=f x tan W, where f represents the focal length of the entire lens system and W represents the half angle-of-view.

20. The zoom lens system according to claim 19, wherein said zoom lens system satisfies the following condition:

$$0.25<DP_{min}/f_t<0.8$$

wherein f$_t$ designates the focal length of the entire lens system at the long focal length extremity.

21. A zoom lens system comprising a plurality of lens groups, a mirror which deflects an optical axis of said zoom lens system being positioned between first and second lens groups which are movable upon zooming, optical axes of said first and second lens groups intersecting, no lens group being positioned between said first and second lens groups and said mirror, wherein said zoom lens system satisfies the following condition:

$$0.25<DM_{min}/f_t<0.8$$

wherein

DM$_{min}$=DMa+DMb;

DMa designates the minimum distance from the lens group immediately before said mirror to the center of said mirror which is defined as the intersecting point where the optical axis meets the reflection surface of said mirror;

DMb designates the minimum distance from the center of said mirror to the lens group immediately behind said mirror; and f$_t$ designates the focal length of the entire lens system at the long focal length extremity.

22. A zoom lens system comprising a plurality of lens groups, a prism which deflects an optical axis of said zoom lens system being positioned between first and second lens groups which are movable upon zooming, optical axes of said first and second lens groups intersecting, no lens group being positioned between said first and second lens groups and said prism, wherein said zoom lens system satisfies the following condition:

$$0.8<DP_{min}/2y<1.5$$

wherein

DP$_{min}$=DPa+(Lp/Np)+DPb;

DPa designates the minimum distance from the lens group immediately before said prism to said prism;

Lp designates the axial thickness of said prism along the optical axis;

Np designates the refractive index of said prism;

DPb designates the minimum distance from said prism to the lens group immediately behind said prism; and 2y designates the image size determined by the optical system according to the relationship y=f x tan W where f represents the focal length of the entire lens system, and W represents the half angle-of-view.

23. The zoom lens system according to claim 22, wherein said zoom lens system satisfies the following condition:

$$0.25 < DP_{min}/f_t < 0.8$$

wherein $f_t$ designates the focal length of the entire lens system at the long focal length extremity.

* * * * *